United States Patent
Cha

(10) Patent No.: US 10,940,735 B2
(45) Date of Patent: Mar. 9, 2021

(54) VEHICLE CONTROL APPARATUS AND VEHICLE CONTROL METHOD

(71) Applicant: MANDO CORPORATION, Gyeonggi-do (KR)

(72) Inventor: Sa-Rang Cha, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 85 days.

(21) Appl. No.: 16/435,440

(22) Filed: Jun. 7, 2019

(65) Prior Publication Data
US 2019/0375264 A1 Dec. 12, 2019

(30) Foreign Application Priority Data

Jun. 8, 2018 (KR) .................. 10-2018-0066320
Jun. 8, 2018 (KR) .................. 10-2018-0066326

(51) Int. Cl.
*B60G 21/055* (2006.01)
*B60W 50/06* (2006.01)
*B60W 10/22* (2006.01)

(52) U.S. Cl.
CPC ......... *B60G 21/0555* (2013.01); *B60W 10/22* (2013.01); *B60W 50/06* (2013.01);
(Continued)

(58) Field of Classification Search
CPC .............. B60G 21/0555; B60G 21/055; B60G 2206/427; B60G 2400/204;
(Continued)

(56) References Cited

U.S. PATENT DOCUMENTS 6,175,792 B1 * 1/2001 Jones .................. B60G 17/0182
280/5.507
6,439,582 B1 * 8/2002 Burdock ............ B60G 17/0162
280/5.506
(Continued)

FOREIGN PATENT DOCUMENTS

JP 2010-116062 5/2010
KR 10-2016-0066415 6/2016
(Continued)

OTHER PUBLICATIONS

Office Action dated Jun. 16, 2019 for Korean Application No. 10-2018-0066326 and its English machine translation by Google Translate.
(Continued)

*Primary Examiner* — Keith J Frisby
(74) *Attorney, Agent, or Firm* — Ladas & Parry, LLP

(57) ABSTRACT

Provided are a vehicle control apparatus and a vehicle control method, including: a sensor configured to sense a vehicle speed value, operation information of an actuator for generating a torque in a stabilizer bar of an active roller stabilizer (ARS), and operation information of the stabilizer bar; and a controller configured to calculate a target torque value that is to be generated in the stabilizer bar on the basis of the sensed vehicle speed value, the sensed operation information of the actuator, and the sensed operation information of the stabilizer bar, and to determine whether the sensed vehicle speed value is a target vehicle speed value that is set to perform an ARS control mode, and in response to the sensed vehicle speed value determined to be the target vehicle speed value, and determine a deadband period in which a torque of the actuator is not transmitted, using a change value of a torque value and a change state of the
(Continued)

torque value while the torque value is tracing the calculated target torque value.

40 Claims, 22 Drawing Sheets

(52) U.S. Cl.
CPC .................. *B60G 2206/427* (2013.01); *B60G 2800/9122* (2013.01); *B60W 2510/222* (2013.01)

(58) Field of Classification Search
CPC .. B60G 17/0162; B60G 17/16; B60G 17/018; B60G 17/015; B60G 17/0182; B60G 2800/012; B60G 2800/9122; B60G 2202/135; B60G 2202/1351; B60G 2600/182; B60W 50/06; B60W 10/22; B60W 2510/222
See application file for complete search history.

(56) References Cited

U.S. PATENT DOCUMENTS

| | | | |
|---|---|---|---|
| RE46,828 E * | 5/2018 | Spillane | B60W 10/20 |
| 2007/0150144 A1* | 6/2007 | Yasui | B60G 21/0555 701/38 |
| 2019/0039429 A1* | 2/2019 | Fujii | B60G 17/016 |

FOREIGN PATENT DOCUMENTS

| | | |
|---|---|---|
| KR | 10-2018-0013147 | 2/2018 |
| KR | 10-2018-0038678 | 4/2018 |
| KR | 10-2018-0038687 | 4/2018 |

OTHER PUBLICATIONS

Notice of Allowance dated Oct. 2, 2019 for Korean Application No. 10-2018-0066326 and its English translation provided by Applicant's foreign counsel.

* cited by examiner

VEHICLE CONTROL APPARATUS AND VEHICLE CONTROL METHOD

CROSS-REFERENCE TO RELATED APPLICATION

This application is based on and claims priority under 35 U.S.C. § 119 to Korean Patent Applications No. 10-2018-0066326, filed on Jun. 8, 2018 and No. 10-2018-0066320, filed on Jun. 8, 2018 in the Korean Intellectual Property Office, the disclosures of which are incorporated herein by reference.

BACKGROUND

1. Field

The present invention relates to a vehicle control apparatus and a vehicle control method.

2. Description of the Related Art

In general, the conventional active roll stabilizer (ARS) for a vehicle is designed to vary a roll stiffness of a stabilizer bar according to a travel situation of the vehicle to reduce a lateral sweep of a vehicle body caused by a centrifugal force when the vehicle turns or travels on a rough road surface.

An example of the ARS is disclosed in Korean Laid-Open Patent Publication No. 10-2018-0038687 (Apr. 17, 2018), relating to an ARS capable of variably adjusting a roll stiffness of a stabilizer bar according to a travel situation using an actuator for generating a torque in the stabilizer bar.

However, the conventional ARS has a limitation in efficiently determining a deadband period in which the torque of the actuator is not transmitted.

In addition, the conventional ARS has a limitation in suppressing a response delay in the deadband period.

In addition, the conventional ARS has a limitation in maintaining an optimum response performance for operation, and has a limitation in suppressing vibration and noise generated during operation of the ARS.

RELATED ART DOCUMENT

Patent Document

Korean Laid-Open Patent Publication NO. 10-2018-0038687 (Apr. 17, 2018)

SUMMARY

Therefore, it is an object of the present disclosure to provide a vehicle control apparatus and a vehicle control method, capable of efficiently determining a deadband period in which a torque of an actuator is not transmitted.

It is another object of the present disclosure to provide a vehicle control apparatus and a vehicle control method, capable of suppressing a response delay in a deadband period in which a torque of an actuator is not transmitted.

It is another object of the present disclosure to provide a vehicle control apparatus and a vehicle control method, capable of maintaining an optimum response performance for operation of an ARS.

It is another object of the present disclosure to provide a vehicle control apparatus and a vehicle control method, capable of suppressing vibration and noise generated during operation of an ARS.

Additional aspects of the invention will be set forth in part in the description which follows and, in part, will be obvious from the description, or may be learned by practice of the invention.

Therefore, it is an aspect of the present invention to provide a vehicle control apparatus including: a sensor configured to sense a vehicle speed value, operation information of an actuator for generating a torque in a stabilizer bar of an active roller stabilizer (ARS), and operation information of the stabilizer bar; and a controller configured to calculate a target torque value that is to be generated in the stabilizer bar on the basis of the sensed vehicle speed value, the sensed operation information of the actuator, and the sensed operation information of the stabilizer bar, and to determine whether the sensed vehicle speed value is a target vehicle speed value that is set to perform an ARS control mode, and in response to the sensed vehicle speed value determined to be the target vehicle speed value, and determine a deadband period in which a torque of the actuator is not transmitted, using a change value of a torque value and a change state of the torque value while the torque value is tracing the calculated target torque value.

The controller may be configured to confirm the deadband period when the torque value has a change value greater than a change value of the target torque value during a predetermined period of time while keeping a change state constant. The controller may be further configured to control the actuator to generate a torque in the stabilizer bar according to the calculated target torque value such that the torque value traces the calculated target torque value.

The controller may be further configured to: calculate a target torque value that is to be generated in the stabilizer bar and a target motor speed value on the basis of the sensed vehicle speed value, the sensed operation information of the actuator, and the sensed operation information of the stabilizer bar; and determine whether the sensed vehicle speed value is a target vehicle speed value that is set to perform an ARS control mode, and in response to the sensed vehicle speed value determined to be the target vehicle speed value, determine a deadband period in which a torque of the actuator is not transmitted using a change value of a torque value and a change value of a motor speed value while the torque value and the motor speed value are tracing the calculated target torque value and the calculated target motor speed value.

The controller may be configured to confirm the deadband period when the torque value has a change value greater than a change value of the target torque value while the motor speed value has a change value greater than a change value of the target motor speed value during a predetermined period of time.

The controller may be configured to confirm the deadband period when a difference between the change value of the torque value and the change value of the target torque value is greater than a reference value during a predetermined period of time while the motor speed value has a change value greater than a change value of the target motor speed value.

The controller may be further configured to control the actuator to generate a torque in the stabilizer bar according to the calculated target torque value and the calculated target motor speed value such that the torque value and the motor speed value trace the target torque value and the target motor speed value.

The controller may be further configured to determine whether the sensed vehicle speed value is a target vehicle speed value that is set to perform an ARS gain control mode in the ARS control mode to employ an ARS compensation gain value; and in response to the vehicle speed value being a lower speed range value corresponding to the target vehicle speed value, control a response command for determining the deadband period by using an ARS compensation gain value corresponding to the lower speed range value and set to be smaller than an original ARS gain value in the determination of the deadband period.

The controller, in response to the vehicle speed value being a higher speed range value corresponding to the target vehicle speed value, may be further configured to control a response command for determining the deadband period by using an ARS compensation gain value corresponding to the higher speed range value and set to be larger than the original ARS gain value in the determination of the deadband period.

The controller may be further configured to determine whether the sensed vehicle speed value and the change value of the calculated target torque value are a target vehicle speed value and a target change value set to perform an ARS gain control mode in the ARS control mode to employ an ARS compensation gain value; and in response to the vehicle speed value being a lower speed range value corresponding to the target vehicle speed value and in response to the change value of the target torque value being a small change range value corresponding to the target change value, control a response command for determining the deadband period by using an ARS compensation gain value corresponding to the lower speed range value and the small change range value and set to be smaller than an original ARS gain value in the determination of the deadband period.

The controller, in response to the vehicle speed value being a higher speed range value corresponding to the target vehicle speed value and in response to the change value of the target torque value being a large change range value corresponding to the target change value, may be further configured to control a response command for determining the deadband period by using an ARS compensation gain value corresponding to the higher speed range value and the large change range value and set to be larger than the original ARS gain value in the determination of the deadband period.

The sensor may be further configured to sense a steering speed value, wherein the controller may be further configured to: determine whether the sensed vehicle speed value and the sensed steering speed value are a target vehicle speed value and a target steering speed value that are set to perform an ARS gain control mode in the ARS control mode to employ an ARS compensation gain value; and in response to the vehicle speed value being a lower speed range value corresponding to the target vehicle speed value and in response to the steering speed value being a lower steering speed range value corresponding to the target steering speed value, control a response command for determining the deadband period by using an ARS compensation gain value corresponding to the lower speed range value and the lower steering speed range value and set to be smaller than an original ARS gain value in the determination of the deadband period.

The controller, in response to the vehicle speed value being a higher speed range value corresponding to the target vehicle speed value and in response to the steering speed value being a higher steering speed range value corresponding to the target steering speed value, may be further configured to control a response command for determining the deadband period by using an ARS compensation gain value corresponding to the higher speed range value and the higher steering speed range value and set to be larger than an original ARS gain value in the determination of the deadband period.

It is another aspect of the present invention to provide a vehicle control apparatus including: a sensor configured to sense a steering angle value and sense operation information of an actuator for generating a torque in a stabilizer bar of an active roll stabilizer (ARS) and operation information of the stabilizer bar; and a controller configured to calculate a target torque value that is to be generated in the stabilizer on the basis of the sensed steering angle value, the sensed operation information of the actuator, and the sensed operation information of the stabilizer bar, and determine whether the sensed steering angle value has no change when performing a feedback control in which a torque value traces the calculated target torque value; and a filter, in response to no change of the steering angle value, further configured to remove a noise signal of a feedback signal according to a first filtering level that is set to perform a strong filtering on the feedback signal during the feedback control.

The filter, in response to a change of the steering angle value, may be further configured to remove a noise signal of the feedback signal according to a second filtering level that is set to perform a weak filtering on the feedback signal.

The controller may be further configured to perform a feedforward control by outputting a feedforward signal such that an actuator driver command corresponding to the target torque value is applied in advance to operate the actuator. The filter, in response to a change of the steering angle value, may be further configured to remove a noise signal of the feedback signal according to a second filtering level that is set to perform a weak filtering on the feedback signal. The controller may be further configured to calculate an actuator target position value by adding a target position value of the feedback signal, in which the noise signal is removed according to one of the first filtering level and the second filtering level, together with a target position value of the feedforward signal.

The controller may be further configured to determine a need for a rapid response in the determination of a deadband period in which a torque of the actuator is not transmitted, and may include a filter, in response to no need for the rapid response, further configured to remove a noise signal of an actuator target position signal, which is generated from the calculated actuator target position value, according to a third filtering level that is set to perform a strong filtering on the actuator target position signal.

The controller may include a filter, in response to a need for the rapid response, further configured to remove a noise signal of an actuator target position signal, which is generated from the calculated actuator target position value, according to a fourth filtering level that is set to perform a weak filtering on the actuator target position signal.

The controller may be further configured to determine a state of being a deadband period in which a torque of the actuator is not transmitted, and may include a filter, in response to the deadband period not confirmed by the controller, further configured to remove a noise signal of an actuator target position signal, which is generated from the calculated actuator target position value, according to a fifth filtering level that is set to perform a strong filtering on the actuator target position signal.

The controller may include a filter, in response to the deadband period confirmed by the controller, configured to remove a noise signal of an actuator target position signal, which is generated from the calculated actuator target position value, according to a sixth filtering level that is set to perform a weak filtering on the actuator target position signal.

It is another aspect of the present invention to provide a vehicle control method including: sensing a vehicle speed value, operation information of an actuator for generating a torque in a stabilizer bar of an active roller stabilizer (ARS), and operation information of the stabilizer bar; calculating a target torque value that is to be generated in the stabilizer bar on the basis of the sensed vehicle speed value, the sensed operation information of the actuator, and the sensed operation information of the stabilizer bar; determining whether the sensed vehicle speed value is a target vehicle speed value that is set to perform an ARS control mode; and in response to the sensed vehicle speed value determined to be the target vehicle speed value, determining a deadband period in which a torque of the actuator is not transmitted, using a change value of a torque value and a change state of the torque value while the torque value is tracing the calculated target torque value.

The deadband period may be confirmed when the torque value has a change value greater than a change value of the target torque value during a predetermined period of time while keeping a change state constant.

The vehicle control method may further include controlling the actuator to generate a torque in the stabilizer bar according to the calculated target torque value such that the torque value traces the calculated target torque value.

The vehicle control method may further include: calculating a target torque value that is to be generated in the stabilizer bar and a target motor speed value on the basis of the sensed vehicle speed value, the sensed operation information of the actuator, and the sensed operation information of the stabilizer bar; determine whether the sensed vehicle speed value is a target vehicle speed value that is set to perform an ARS control mode; and in response to the sensed vehicle speed value determined to be the target vehicle speed value, determining a deadband period in which a torque of the actuator is not transmitted using a change value of a torque value and a change value of a motor speed value while the torque value and the motor speed value are tracing the calculated target torque value and the calculated target motor speed value.

The deadband period may be confirmed when the torque value has a change value greater than a change value of the target torque value while the motor speed value has a change value greater than a change value of the target motor speed value during a predetermined period of time.

The deadband period may be confirmed when a difference between the change value of the torque value and the change value of the target torque value is greater than a reference value during a predetermined period of time while the motor speed value has a change value greater than a change value of the target motor speed value.

The vehicle control method may further include controlling the actuator to generate a torque in the stabilizer bar according to the calculated target torque value and the calculated target motor speed value such that the torque value and the motor speed value trace the target torque value and the target motor speed value.

The vehicle control method may further include determining whether the sensed vehicle speed value is a target vehicle speed value that is set to perform an ARS gain control mode in the ARS control mode to employ an ARS compensation gain value; and in response to the vehicle speed value being a lower speed range value corresponding to the target vehicle speed value, controlling a response command for determining the deadband period by using an ARS compensation gain value corresponding to the lower speed range value and set to be smaller than an original ARS gain value in the determination of the deadband period.

The vehicle control method may further include, in response to the vehicle speed value being a higher speed range value corresponding to the target vehicle speed value, controlling a response command for determining the deadband period by using an ARS compensation gain value corresponding to the higher speed range value and set to be larger than the original ARS gain value in the determination of the deadband period.

The vehicle control method may further include determining whether the sensed vehicle speed value and the change value of the calculated target torque value are a target vehicle speed value and a target change value that are set to perform an ARS gain control mode in the ARS control mode to employ an ARS compensation gain value; and in response to the vehicle speed value being a lower speed range value corresponding to the target vehicle speed value and the change value of the target torque value being a small change range value corresponding to the target change value, controlling a response command for determining the deadband period by using an ARS compensation gain value corresponding to the lower speed range value and the small change range value and set to be smaller than an original ARS gain value in the determination of the deadband period.

The vehicle control method may further include, in response to the vehicle speed value being a higher speed range value corresponding to the target vehicle speed value and in response to the change value of the target torque value being a large change range value corresponding to the target change value, controlling a response command for determining the deadband period by using an ARS compensation gain value corresponding to the higher speed range value and the large change range value and set to be larger than the original ARS gain value in the determination of the deadband period.

The vehicle control method may further include: sensing a steering speed value; determining whether the sensed vehicle speed value and the sensed steering speed value are a target vehicle speed value and a target steering speed value that are set to perform an ARS gain control mode in the ARS control mode to employ an ARS compensation gain value; and in response to the vehicle speed value being a lower speed range value corresponding to the target vehicle speed value and in response to the steering speed value being a lower steering speed range value corresponding to the target steering speed value, controlling a response command for determining the deadband period by using an ARS compensation gain value corresponding to the lower speed range value and the lower steering speed range value and set to be smaller than an original ARS gain value in the determination of the deadband period.

The vehicle control method may further include, in response to the vehicle speed value being a higher speed range value corresponding to the target vehicle speed value and in response to the steering speed value being a higher steering speed range value corresponding to the target steering speed value, controlling a response command for determining the deadband period by using an ARS compensation gain value corresponding to the higher speed range value and the higher steering speed range value and set to be larger than an original ARS gain value in the determination of the deadband period.

It is another aspect of the present invention to provide a vehicle control method including: sensing a steering angle value and sensing operation information of an actuator for generating a torque in a stabilizer bar of an active roll stabilizer (ARS) and operation information of the stabilizer bar; calculating a target torque value that is to be generated in the stabilizer on the basis of the sensed steering angle value, the sensed operation information of the actuator, and the sensed operation information of the stabilizer bar; determining whether the sensed steering angle value has no change when performing a feedback control in which a torque value traces the calculated target torque value; and in response to no change of the steering angle value, removing a noise signal of a feedback signal according to a first filtering level that is set to perform a strong filtering on the feedback signal during the feedback control.

The vehicle control method may further include, in response to a change of the steering angle value, removing a noise signal of the feedback signal according to a second filtering level that is set to perform a weak filtering on the feedback signal.

The vehicle control method may further include: performing a feedforward control by outputting a feedforward signal such that an actuator driver command corresponding to the target torque value is applied in advance, to operate the actuator; in response to a change of the steering angle value, removing a noise signal of the feedback signal according to a second filtering level that is set to perform a weak filtering on the feedback signal; and calculating an actuator target position value by adding a target position value of the feedback signal, in which the noise signal is removed according to one of the first filtering level and the second filtering level, together with a target position value of the feedforward signal.

The vehicle control method may further include: determining a need for a rapid response in the determination of a deadband period in which a torque of the actuator is not transmitted, and in response to no need for the rapid response, removing a noise signal of an actuator target position signal, which is generated from the calculated actuator target position value, according to a third filtering level that is set to perform a strong filtering on the actuator target position signal.

The vehicle control method may further include, in response to a need for the rapid response, removing a noise signal of an actuator target position signal, which is generated from the calculated actuator target position value, according to a fourth filtering level that is set to perform a weak filtering on the actuator target position signal.

The vehicle control method may further include: determining a state of being a deadband period in which a torque of the actuator is not transmitted, and in response to the deadband period not confirmed, removing a noise signal of an actuator target position signal, which is generated from the calculated actuator target position value, according to a fifth filtering level that is set to perform a strong filtering on the actuator target position signal.

The vehicle control method may further include, in response to the deadband period confirmed, removing a noise signal of an actuator target position signal, which is generated from the calculated actuator target position value, according to a sixth filtering level that is set to perform a weak filtering on the actuator target position signal.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, embodiments of the present invention will be described in detail with reference to the accompanying drawings. The following embodiments are provided to fully convey the spirit of the present invention to a person having ordinary skill in the art to which the present invention belongs. The present invention is not limited to the embodiments shown herein but may be embodied in other forms. In order to make the description of the present invention clear, unrelated parts are not shown and, the sizes of components are exaggerated for clarity.

Figure 1:
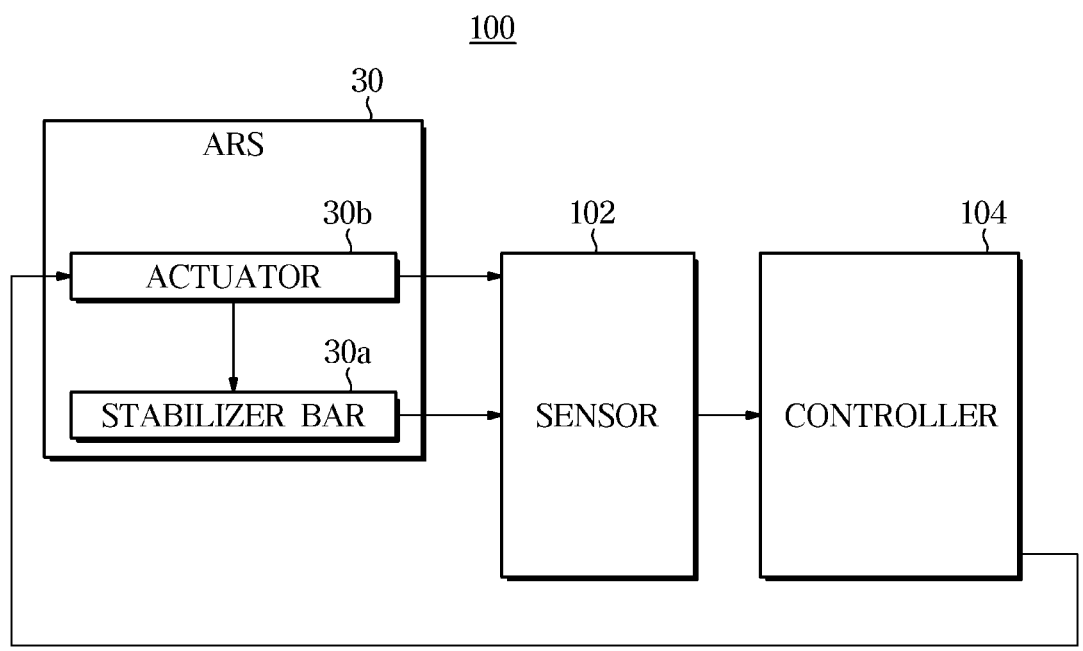
FIG. 1 is a block diagram illustrating an example of a vehicle control apparatus according to an embodiment of the present invention.
Figure 2:
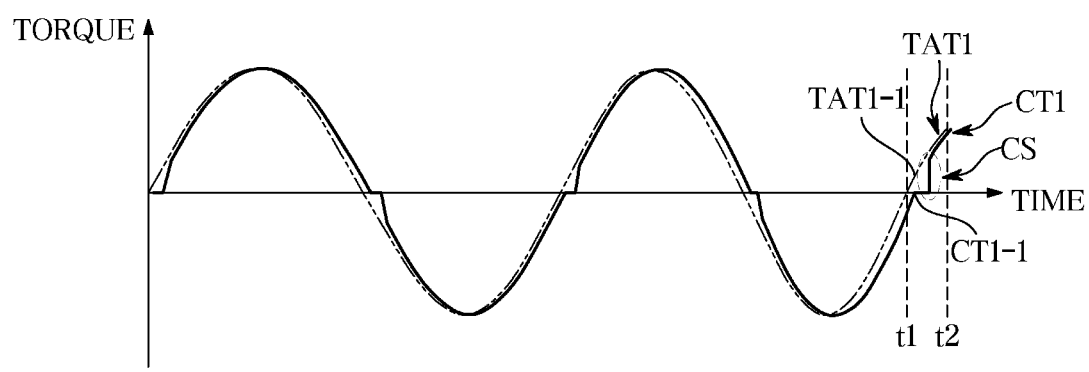
FIG. 2 is a diagram illustrating an example in which a deadband period is determined using a change value of a torque value and a change state of a torque value by a controller shown in FIG. 1.

FIG. 1 is a block diagram illustrating an example of a vehicle control apparatus according to an embodiment of the present invention, and FIG. 2 is a diagram illustrating an example in which a deadband period is determined using a change value of a torque value and a change state of a torque value by a controller shown in FIG. 1.

Figure 3:
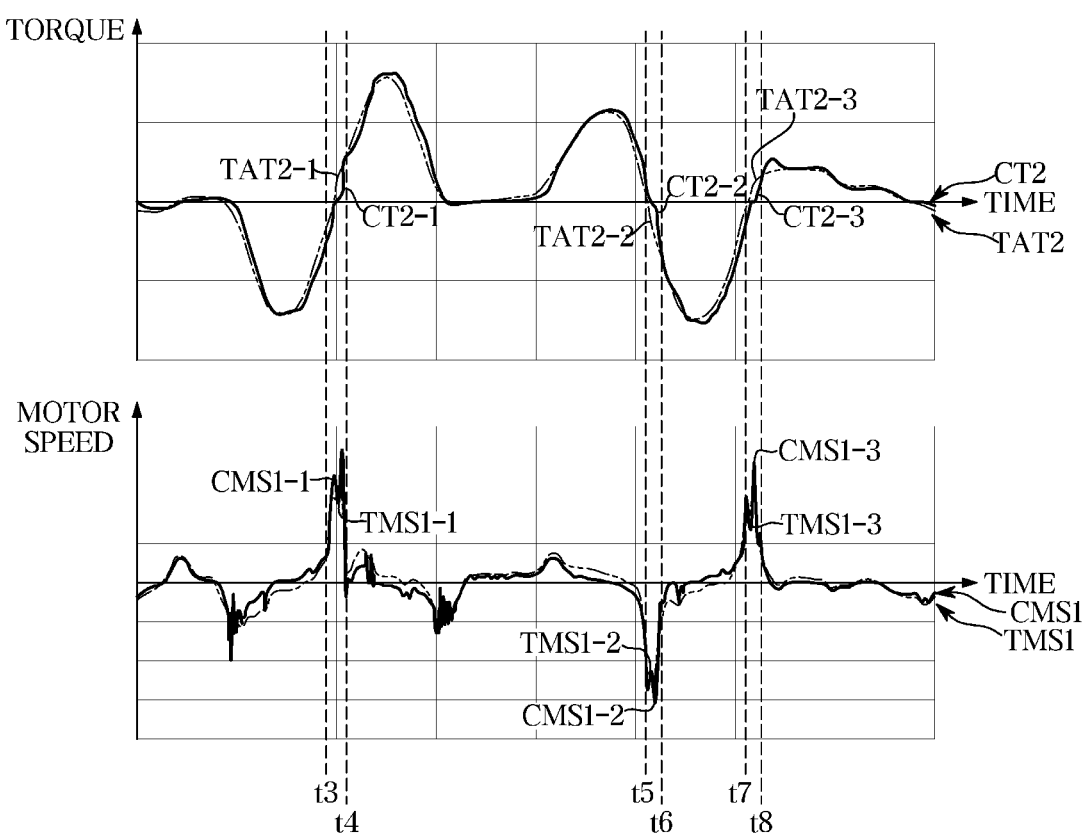
FIG. 3 is a diagram illustrating an example in which a deadband period is determined using a change value of a torque value and a change value of a motor speed value by a controller shown in FIG. 1.
Figure 4:
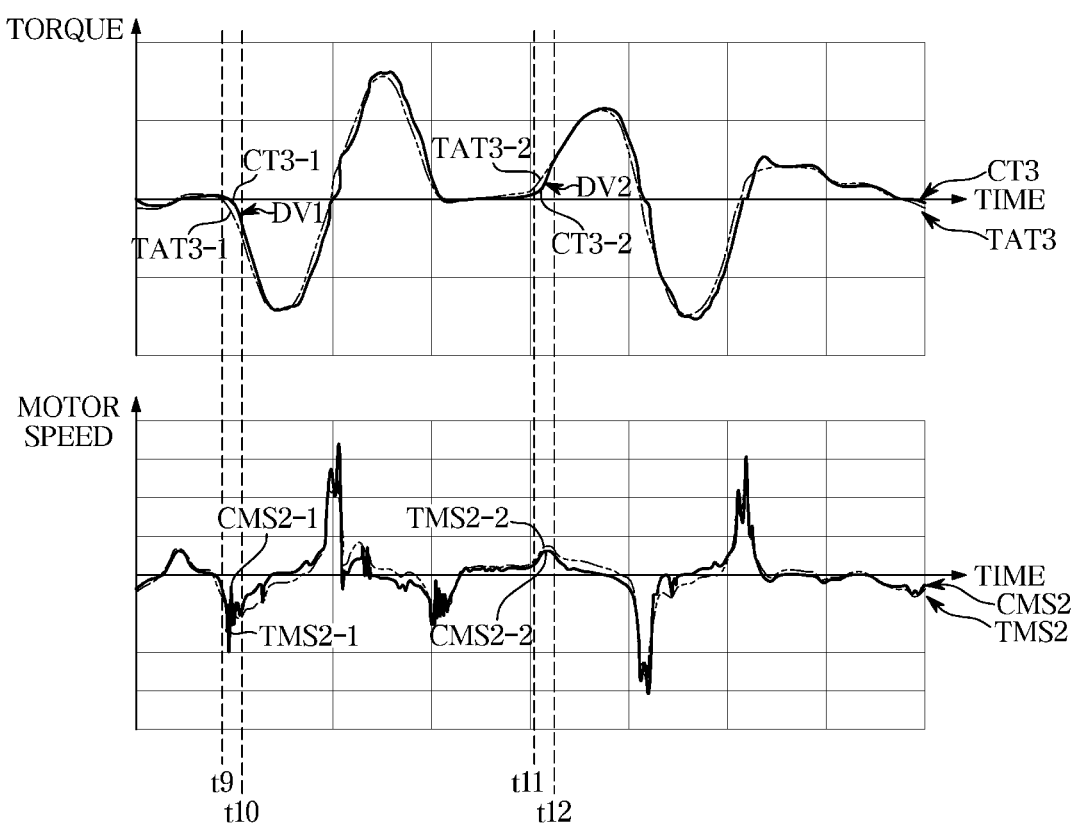
FIG. 4 is a diagram illustrating another example in which a deadband period is determined using a change value of a torque value and a change value of a motor speed value by a controller shown in FIG. 1.

FIG. 3 is a diagram illustrating an example in which a deadband period is determined using a change value of a torque value and a change value of a motor speed value by a controller shown in FIG. 1, and FIG. 4 is a diagram illustrating another example in which a deadband period is determined using a change value of a torque value and a change value of a motor speed value by a controller shown in FIG. 1.

Figure 5:
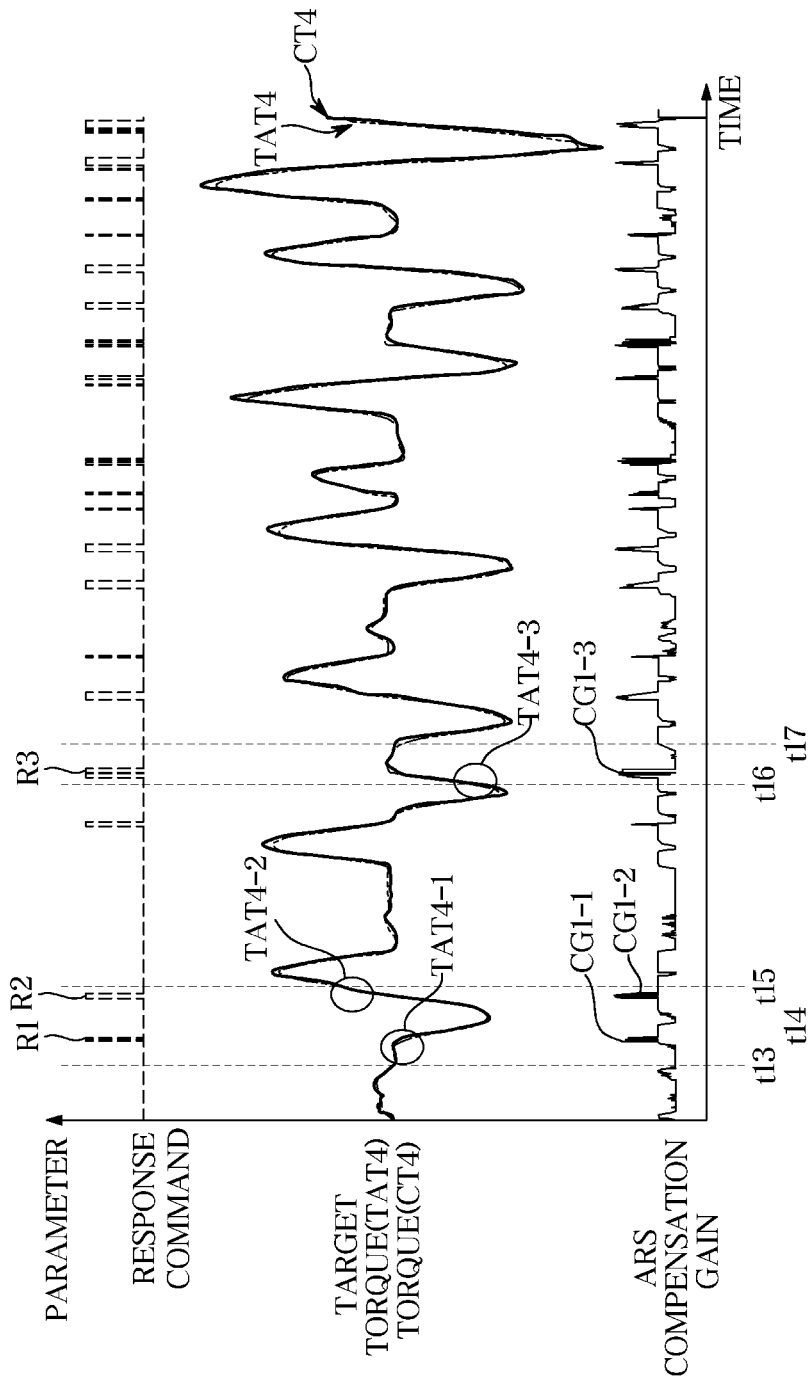
FIG. 5 is a diagram illustrating an example in which a response command for determining a deadband period is controlled by using an ARS compensation gain value at a time of determination of a deadband period by a controller shown in FIG. 1.

FIG. 5 is a diagram illustrating an example in which a response command for determining a deadband period is controlled by using an ARS compensation gain value at a time of determination of a deadband period by a controller shown in FIG. 1.

Figure 6:
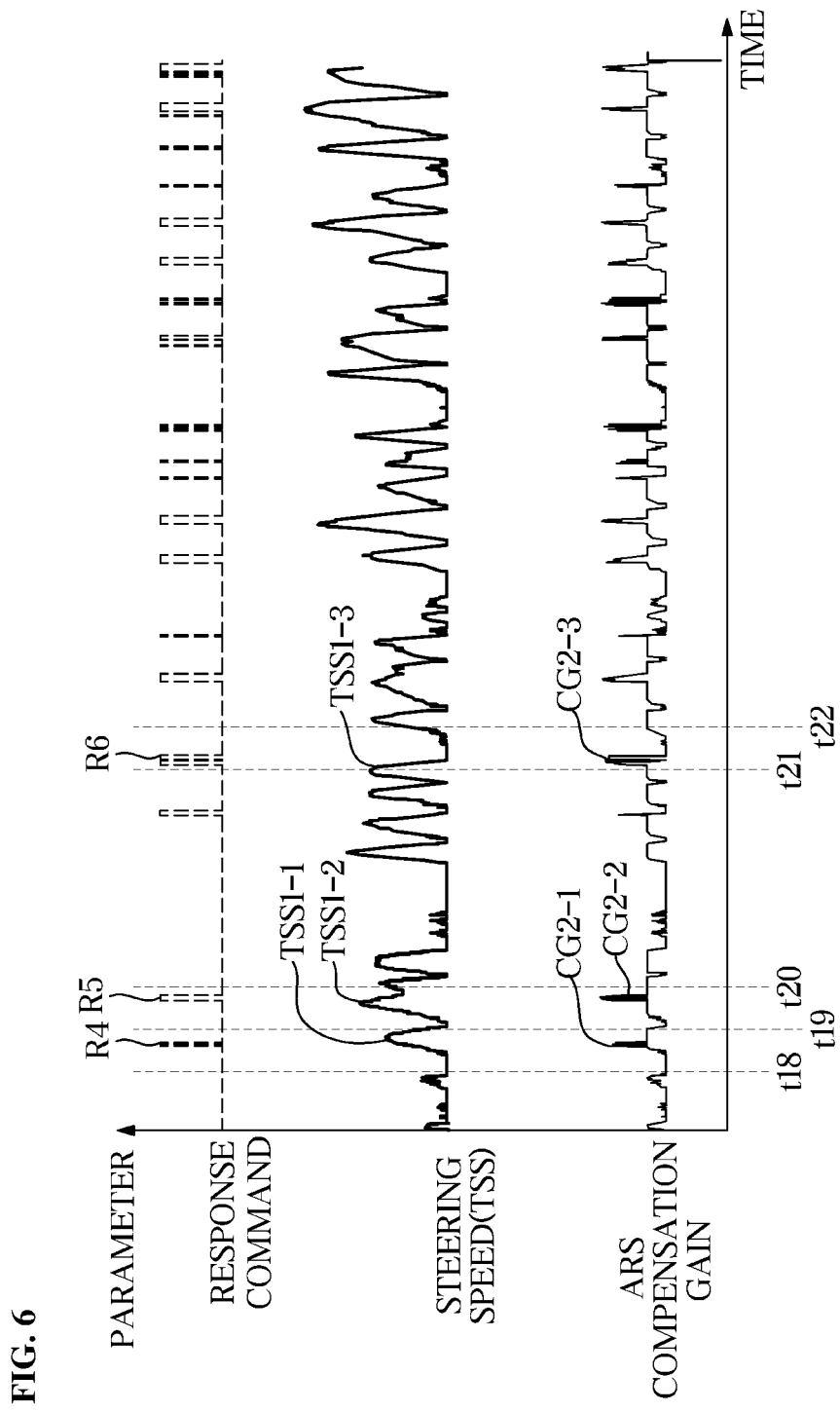
FIG. 6 is a diagram illustrating another example in which a response command for determining a deadband period is controlled by using an ARS compensation gain value at a time of determination of a deadband period by a controller shown in FIG. 1.

FIG. 6 is a diagram illustrating another example in which a response command for determining a deadband period is controlled by using an ARS compensation gain value at a time of determination of a deadband period by a controller shown in FIG. 1.

Referring to FIGS. 1 to 6, a vehicle control apparatus 100 according to an embodiment of the present invention includes a sensor 102 and a controller 104.

The sensor 102 senses a vehicle speed value, and senses operation information of an actuator 30b for generating a torque in a stabilizer bar 30a of an active roll stabilizer (ARS) 30 and operation information of the stabilizer bar 30a.

The controller 104 calculates a target torque value that is to be generated in the stabilizer bar 30a on the basis of the vehicle speed value sensed by the sensor 102, the operation information of the actuator 30b sensed by the sensor 102, and the operation information of the stabilizer bar 30a sensed by the sensor 102.

In addition, the controller 104 may further calculate a target torque value that is to be generated in the stabilizer bar 30a and a target motor speed value on the basis of the vehicle speed value sensed by the sensor 102, the operation information of the actuator 30b sensed by the sensor 102, and the operation information of the stabilizer bar 30a sensed by the sensor 102.

The controller 104 determines whether the vehicle speed value sensed by the sensor 102 is a target vehicle speed that is set to perform an ARS control mode Referring to FIGS. 1 and 2, the controller 104, in response to the vehicle speed value determined to be the target vehicle speed value, is configured to, while a torque value CT1 is tracing the target torque value TAT1, determine a deadband period in which a torque of the actuator 30b is not transmitted, using a change value CT1-1 of the torque value CT1 and a change state CS of the torque value CT1.

For example, the controller 104 may determine a period from t1 to t2 to be a deadband period in which a torque of the actuator 30b is not transmitted, when the torque value CT1 has a change value CT1-1 greater than a change value TAT1-1 of the target torque value TAT1 while keeping a change state CS constant during a predetermined period of time.

In addition, referring to FIGS. 3 and 4, the controller 104, in response to the sensed vehicle speed value determined to be the target vehicle speed, may further determine a deadband period in which a torque of the actuator 30b is not transmitted, using change values CT2-1 to CT2-3, and CT3-1 and CT3-2 of torque values CT2 and CT3 and change values CMS1-1 to CMS1-3, and CMS2-1 and CMS2-2 of motor speed values CMS1 and CMS2 while the torque values CT2 and CT3 and the motor speed values CMS1 and CMS2 are tracing the target torque values TAT2 and TAT3 and the target motor speed values TMS1 and TMS2.

For example, referring to FIG. 3, in response to determining that change values CT2-1, CT2-2, and CT2-3 of the torque value CT2 are greater than change values TAT2-1, TAT2-2, and TAT2-3 of the target torque value TAT2, respectively, while change values CMS1-1, CMS1-2, and CMS1-3 of the motor speed value CMS1 are greater than change values TMS1-1, TMS1-2, and TMS1-3 of the target motor speed value TMS1, respectively, during a predetermined period of time, the controller 104 may determine a period from t3 to t4, a period from t5 to t6, and a period from t7 to t8 to be a deadband period in which a torque of the actuator 30b is not transmitted.

As another example, referring to FIG. 4, in response to determining that difference values DV1 and DV2 between change values CT3-1 and CT3-2 of a torque value CT3 and change values TAT3-1 and TAT3-2 of a target torque value TAT3 are each greater than a corresponding reference value, while change values CMS2-1 and CMS2-2 of a motor speed value CMS2 are greater than change values TMS2-1 and TMS2-2 of a target motor speed value TMS2 during a predetermined period of time, the controller 104 may determine a period from t9 to t10 and a period from t11 to t12 to be a deadband period in which a torque of the actuator 30b is not transmitted.

The vehicle control apparatus 100 according to the embodiment of the present invention may further determine whether the vehicle speed value sensed by the sensing 102 is a target vehicle speed value set to perform an ARS gain control mode in the ARS control mode to employ an ARS compensation gain value.

In this case, the controller 104, in response to determining that the vehicle speed value is a lower speed range value corresponding to the target vehicle speed value, is configured to control a response command for determining the deadband period by using an ARS compensation gain value corresponding to the lower speed range value and set to be smaller than an original ARS gain value in the determination of the deadband period.

In addition, the controller 104, in response to determining that the vehicle speed value is a higher speed range value corresponding to the target vehicle speed value, control a response command for determining the deadband period by using an ARS compensation gain value corresponding to the higher speed range value and set to be larger than an original ARS gain value in the determination of the deadband period.

The controller 104 of the vehicle control apparatus 100 according to the embodiment of the present invention may further determine whether the vehicle speed value sensed by the sensor 102 and the change value of the calculated target torque value are a target vehicle speed and a target change value that are set to perform an ARS gain control mode in the ARS control mode to employ an ARS compensation gain value.

In this case, the controller 104, in response to determining that the vehicle speed value is a lower speed range value corresponding to the target vehicle speed value, and the change value of the target torque value is a small change range value corresponding to the target change value, is further configured to control a response command for determining the deadband period by using an ARS compensation gain value corresponding to the lower speed range value and the small change range value and set to be smaller than an original ARS gain value.

In addition, the controller 104, in response to determining that the vehicle speed value is a higher speed range value corresponding to the target vehicle speed value, and the change value of the target torque value is a large change range value corresponding to the target change value, is further configured to control a response command for determining the deadband period by using an ARS compensation gain value corresponding to the higher speed range value and the large change range value and set to be larger than an original ARS gain value.

For example, referring to FIGS. 1 and 5, the controller 104, in response to determining that a vehicle speed value is a higher speed range value corresponding to the target vehicle speed value, and a change value TAT4-1, TAT4-2 or TAT4-3 of a target torque value TAT4 is a large change range value corresponding to the target change value, may be further configured to control a response command R1, R2, or R3 for determining the deadband period by using an ARS compensation gain value CG1-1, CG1-2, or CG1-3 corresponding to the higher speed range value and the large change range value and set to be larger than an original ARS gain value.

In this case, the controller 104 may control rapid response commands R1 and R3 for determining the deadband period.

The sensor 102 of the vehicle control apparatus 100 according to the embodiment of the present invention may further sense a steering speed value.

Here, the controller 104 may further determine whether the vehicle speed value and the steering speed value sensed by the sensor 102 are a target vehicle speed value and a target steering speed value set to perform an ARS gain control mode in the ARS control mode to employ an ARS compensation gain value.

The controller 104, in response to determining that the vehicle speed value is a lower speed range value corresponding to the target vehicle speed value and the steering speed value is a lower steering speed range value corresponding to the target steering speed value, may be configured to control a response command for determining the deadband period by using an ARS compensation gain value corresponding to the lower speed range value and the lower steering speed range value and set to be smaller than an original ARS gain value.

In addition, the controller 104, in response to determining that the vehicle speed value is a higher speed range value corresponding to the target vehicle speed value, and the steering speed value is a higher steering speed range value corresponding to the target steering speed value, may be configured to control a response command for determining the deadband period by using an ARS compensation gain value corresponding to the higher speed range value and the higher steering speed range value and set to be larger than an original ARS gain value.

For example, referring to FIGS. 1 and 6, the controller 104, in response to determining that the vehicle speed value is a higher speed range value corresponding to a target vehicle speed value, and the steering speed value is a higher steering speed range value corresponding to a target steering speed value TSS1-1, TSS1-2, or TSS1-3, may be further configured to control a response command R4, R5, or R6 for determining the deadband period by using an ARS compensation gain value CG2-1, CG2-2 or CG2-3 corresponding to the higher speed range value and the higher steering speed range value and set to be larger than an original ARS gain value in the determination of the deadband period during a period from t18 to t19, a period from t19 to t20, or a period from t21 to t22.

In this case, the controller 104 may control rapid response commands R4 and R6 for determining the deadband period.

Referring to FIGS. 1 and 2, the controller 104 of the vehicle control apparatus 100 according to the embodiment of the present invention may be further configured to control the actuator 30b to generate a torque in the stabilizer bar 30a according to the calculated target torque value TAT1 with the torque value CT1 tracing the calculated target torque value TAT1.

In addition, referring to FIGS. 1, 3, and 4, the controller 104 may be further configured to control the actuator 30b to generate a torque in the stabilizer bar 30a according to the calculated target torque values TAT2 and TAT3 and the target motor speed values TMS1 and TMS 2 with the torque values CT2 and CT3 and the motor speed values CMS1 and CMS2 tracing the target torque values TAT2 and TAT3 and the target motor speed values TMS1 and TMS 2.

Figure 7:
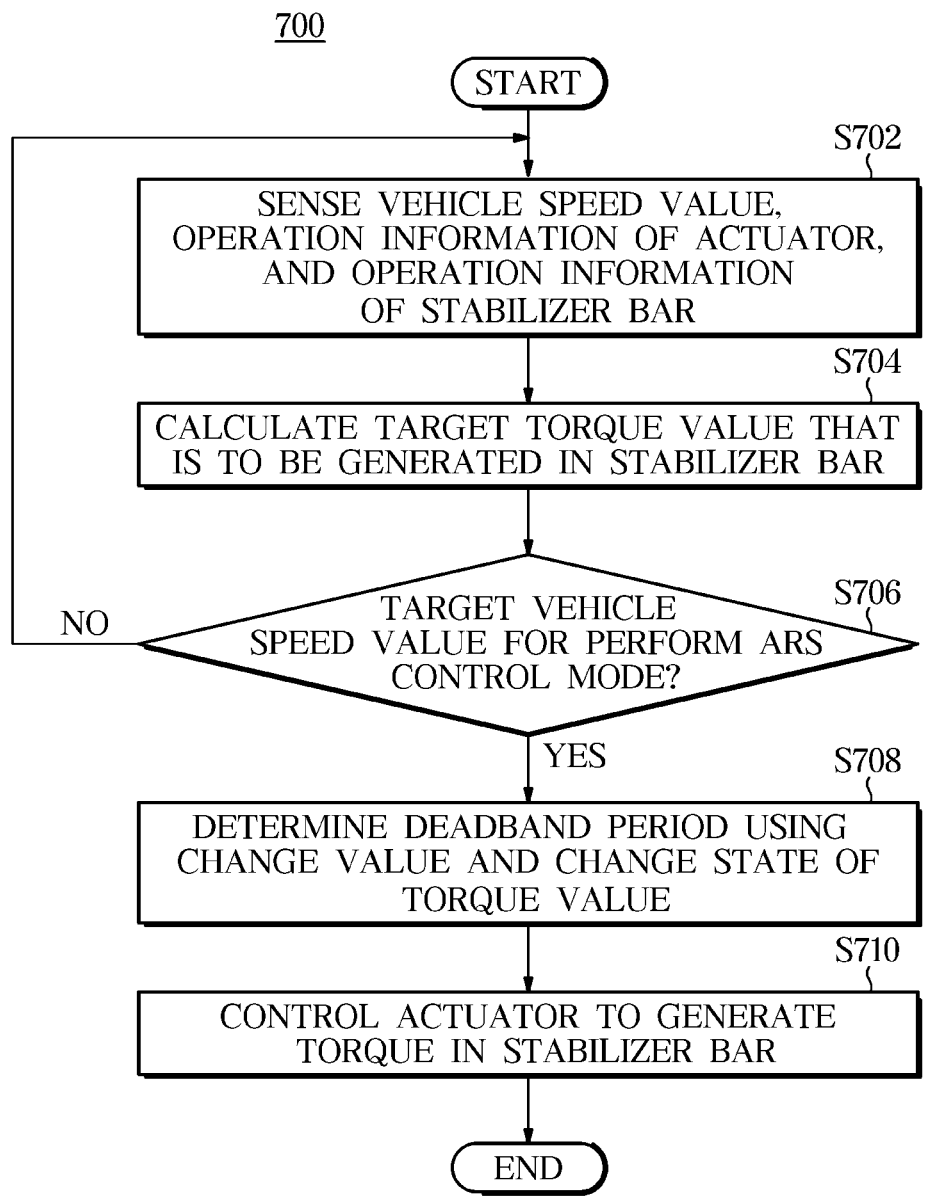
FIG. 7 is a flowchart showing an example of a vehicle control method for a vehicle control apparatus according to an embodiment of the present invention.
Figure 8:
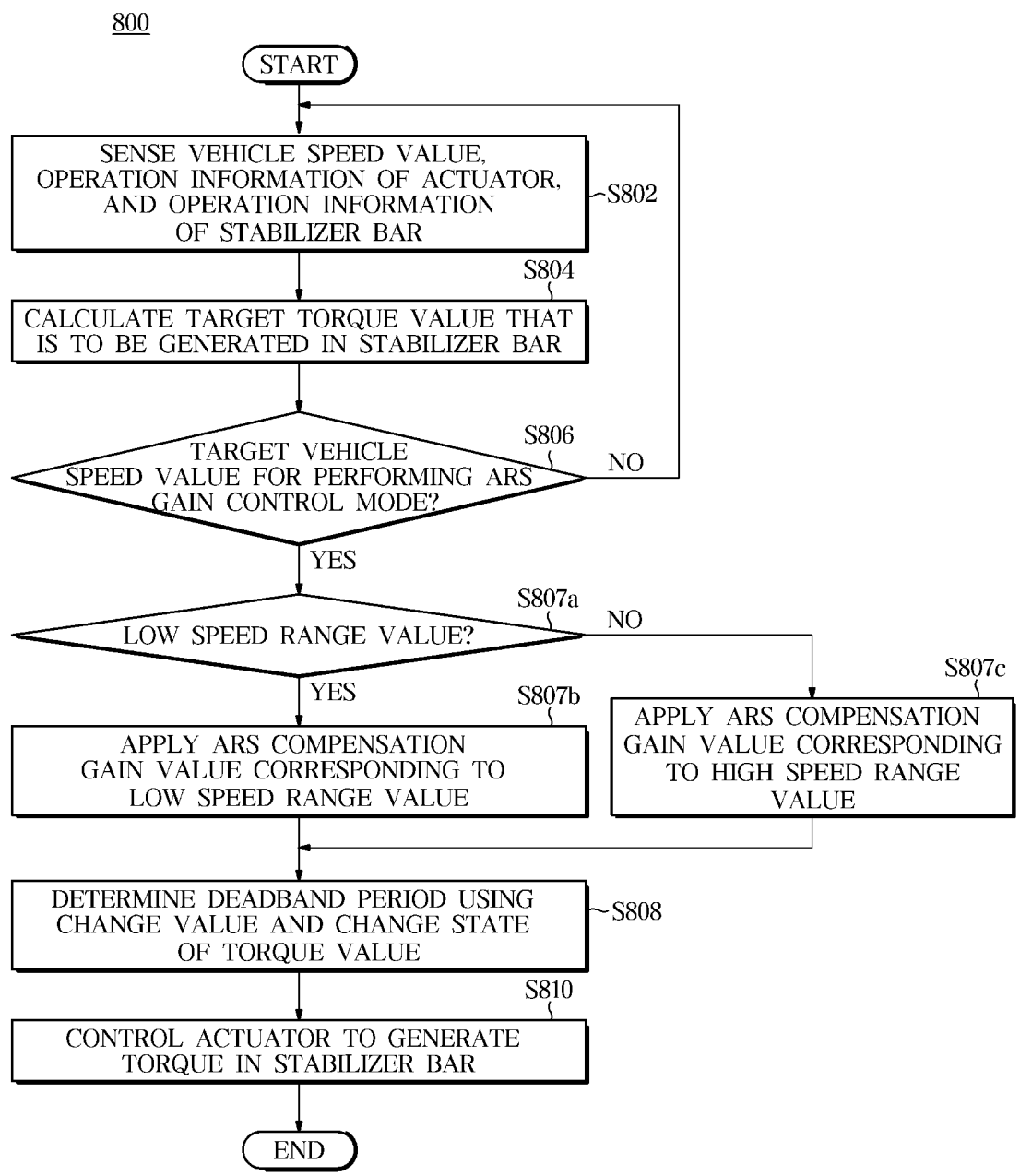
FIG. 8 is a flowchart showing another example of a vehicle control method for a vehicle control apparatus according to an embodiment of the present invention.

FIG. 7 is a flowchart showing an example of a vehicle control method of a vehicle control apparatus according to an embodiment of the present invention, and FIG. 8 is a flowchart showing another example of a vehicle control method of a vehicle control apparatus according to an embodiment of the present invention.

Figure 9:
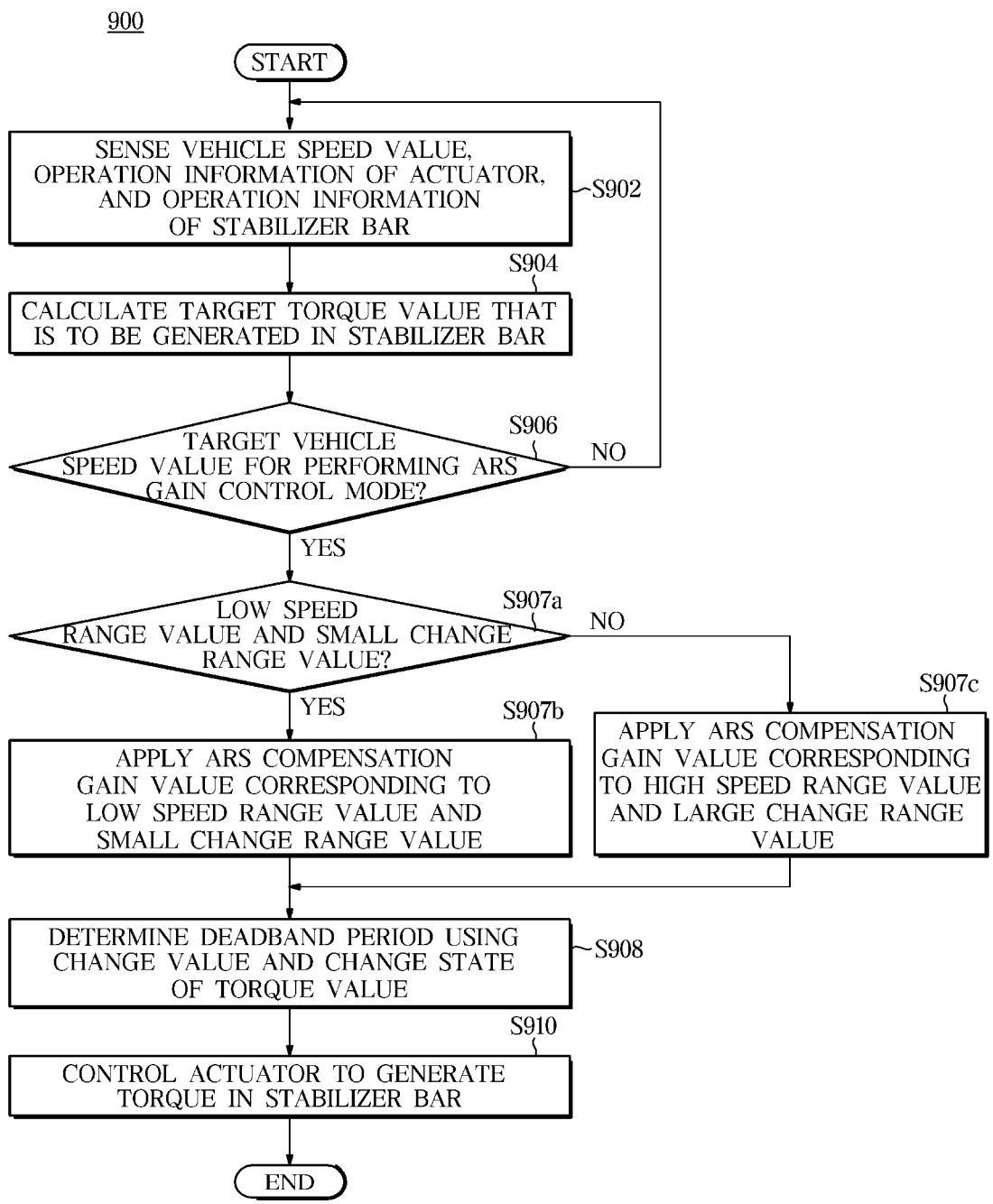
FIG. 9 is a flowchart showing another example of a vehicle control method for a vehicle control apparatus according to an embodiment of the present invention.
Figure 10:
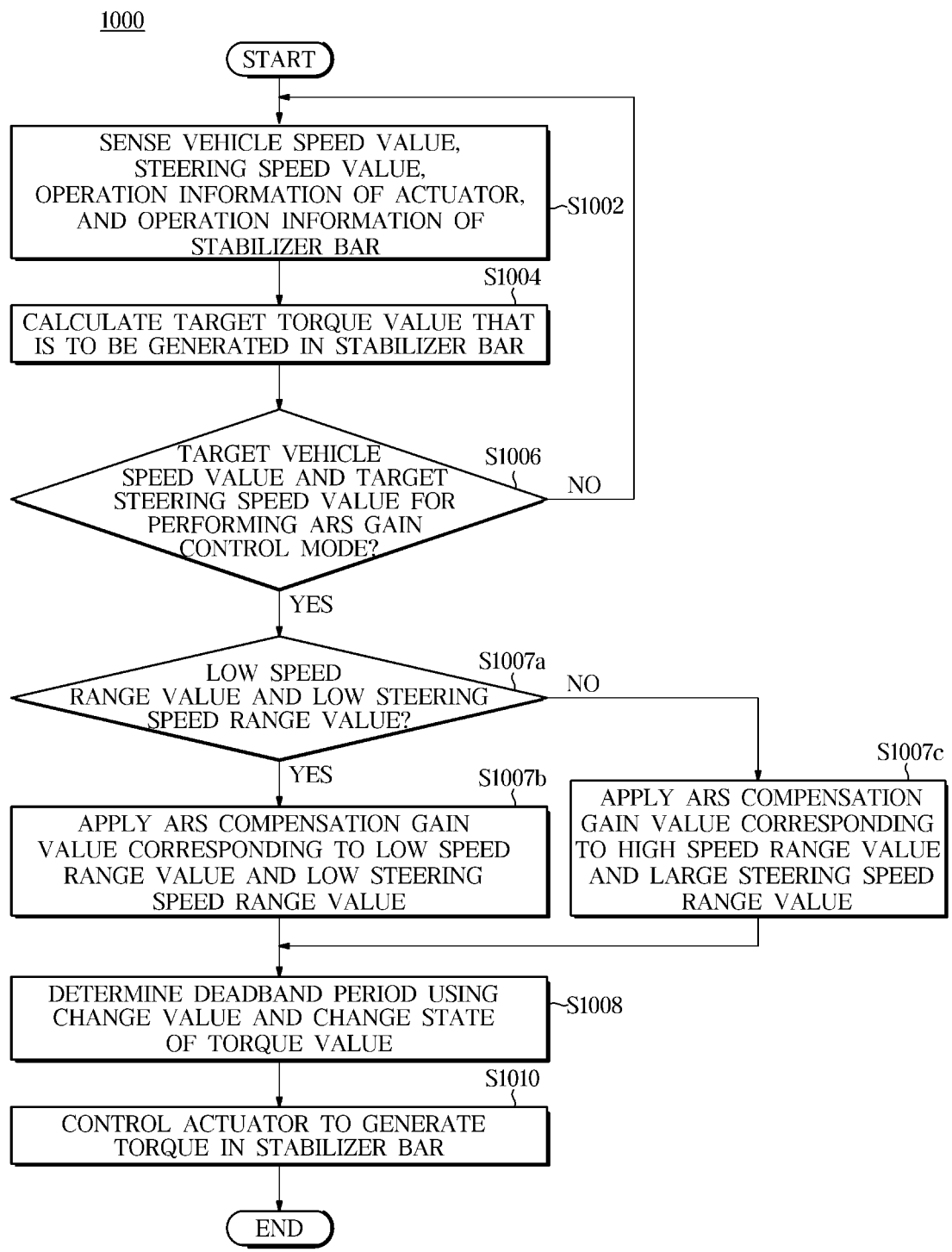
FIG. 10 is a flowchart showing another example of a vehicle control method for a vehicle control apparatus according to an embodiment of the present invention.

FIG. 9 is a flowchart showing another example of a vehicle control method for a vehicle control apparatus according to an embodiment of the present invention, and FIG. 10 is a flowchart showing another example of a vehicle control method for a vehicle control apparatus according to an embodiment of the present invention.

Referring to FIGS. 7 to 10, the vehicle control method (700, 800, 900 or 1000) of the vehicle control apparatus (100 in FIG. 1) according to the embodiment of the present invention includes sensing (S702, S802, S902, or S1002), calculation (S704, S804, S904, or S1004), first determination (S706, S806, S906, or S1006), and second determination (S708, S808, S908, or S1008)

In the sensing S702, S802, S902, or S1002, the sensor (102 in FIG. 1) senses a vehicle speed value, and senses operation information of the actuator 30b for generating a torque in a stabilizer bar 30*a* of an active roll stabilizer (ARS) 30 and operation information of the stabilizer bar 30*a*.

In the calculation S704, S804, S904, or S1004, the controller (104 in FIG. 1) calculates a target torque value that is to be generated in the stabilizer bar (30*a* in FIG. 1) on the basis of the vehicle speed value sensed by the sensor (102 in FIG. 1), the operation information of the actuator (30*b* in FIG. 1) sensed by the sensor (102 in FIG. 1), and the operation information of the stabilizer bar (30*a* in FIG. 1) sensed by the sensor (102 in FIG. 1).

In the first determination S706, S806, S906, or S1006, the controller (104 in FIG. 1) determines whether the vehicle speed value sensed by the sensor (102 in FIG. 1) is a target vehicle speed value to perform an ARS control mode that is set in the controller (104 in FIG. 1).

In the second determination S708, S808, S908, or S1008, the controller (104 in FIG. 1) when the vehicle speed value is determined to be the target vehicle speed value by the controller (104 in FIG. 2), is configured to, while a torque value (CT1 in FIG. 2) is tracing the target torque value (TAT1 in FIG. 2) calculated by the controller (104 in FIG. 1), determine a deadband period in which a torque of the actuator (30*b* in FIG. 2) is not transmitted, using a change value (CT1-1 in FIG. 2) of the torque value (CT1 in FIG. 2) and a change state (CS in FIG. 2) of the torque value (CT1 in FIG. 2).

For example, in the second determination S708, S808, S908, or S1008, the controller (104 in FIG. 1) determines a period t1 to t2 shown in FIG. 2 to be a deadband period in which a torque of the actuator (30*b* in FIG. 2) is not transmitted, when the torque value (CT1 in FIG. 2) has a change value (CT1-1 in FIG. 2) greater than a change value (TAT1-1 in FIG. 2) of the target torque value (TAT1 in FIG. 2) while keeping a change state (CS in FIG. 2) constant during a predetermined period of time.

Referring to FIG. 8, the vehicle control method 800 of the vehicle control apparatus (100 in FIG. 1) according to the embodiment may further perform third determination (S807*a*) and first control (S807*b* or S807*c*).

In the first determination S806, the controller (104 in FIG. 1) may further determine whether the vehicle speed value sensed by the sensor (102 in FIG. 1) is a target vehicle speed value for performing an ARS gain control mode in the ARS control mode that is set in the controller (104 in FIG. 1) to employ an ARS compensation gain value.

In the third determination S807*a*, the controller (104 in FIG. 1) may determine whether the vehicle speed value is a lower speed range value corresponding to the target vehicle speed value.

In the first control S807*b*, the controller (104 in FIG. 1), in response to determining the vehicle speed value to be a lower speed range corresponding to the target vehicle speed value, is configured to control a response command for determining the deadband period by using an ARS compensation gain value corresponding to the lower speed range value and set to be smaller than an original ARS gain value in the determination of the deadband period.

On the other hand, in the first control S807*c*, the controller (104 in FIG. 1), in response to the vehicle speed value determined to be a higher speed range corresponding to the target vehicle speed value, is configured to control a response command for determining the deadband period by using an ARS compensation gain value corresponding to the higher speed range and set to be larger than an original ARS gain value in the determination of the deadband period.

Referring to FIG. 9, the vehicle control method 900 of the vehicle control apparatus (100 in FIG. 1) according to the embodiment may further perform third determination (S907*a*) and first control (S907*b* or S907*c*).

In this case, in the first determination S906, the controller (104 in FIG. 1) may determine whether the vehicle speed value sensed by the sensor (102 in FIG. 1) and the change value of the calculated target torque value are a target vehicle speed value and a target change value for performing an ARS gain control mode in the ARS control mode that are set in the controller (104 in FIG. 1) to employ an ARS compensation gain value.

Here, in the third determination S907*a*, the controller (104 in FIG. 1) may determine whether the vehicle speed value is a lower speed range value corresponding to the target vehicle speed value, and the change value of the target torque value is a small change range value corresponding to the target change value.

In this case, in the first control S907*b*, the controller (104 in FIG. 1), in response to determining the vehicle speed value to be a lower speed range value corresponding to the target vehicle speed, and the change value of the target torque value to be a small change range value corresponding to the target change value, may be further configured to control a response command for determining the deadband period by using an ARS compensation gain value corresponding to the lower speed range value and the small change range value and set to be smaller than an original ARS gain value.

On the other hand, in the first control S907*c*, the controller (104 in FIG. 1), in response to the vehicle speed value to be a higher speed range value corresponding to the target vehicle speed value, and the change value of the target torque value to be a large change range value corresponding to the target change value, may be further configured to control a response command for determining the deadband period by using an ARS compensation gain value corresponding to the higher speed range value and the large change range value and set to be larger than an original ARS gain value.

For example, in the first control S907*c*, the controller (104 in FIG. 1), in response to determining a vehicle speed value to be a higher speed range value corresponding to a target vehicle speed value, and a change value (TAT4-1, TAT4-2, or TAT4-3 in FIG. 5) of a target torque value (TAT4 in FIG. 5) to be a large change range value corresponding to a target change value, may be further configured to control a response command (R1, R2, or R3 in FIG. 5) for determining the deadband period by using an ARS compensation gain value (CG1-1, CG1-2, or CG1-3 in FIG. 5) corresponding to the higher speed range value and the large change range value and set to be larger than an original ARS gain value.

In this case, the controller (104 in FIG. 1) may control rapid response commands (R1 and R3 in FIG. 5) for determining the deadband period.

Referring to FIG. 10, the vehicle control method 1000 of the vehicle control apparatus (100 in FIG. 1) according to the embodiment of the present invention may further include third determination (S1007*a*) and first control (S1007*b* and S1007*c*).

Here, in the sensing S1002, the sensor (102 in FIG. 1) may further sense a steering speed value.

In this case, in the first determination S1006, the controller (104 in FIG. 1) may further determine whether the vehicle speed value and the steering speed value sensed by the sensor (102 in FIG. 1) are a target vehicle speed value and a target steering speed value for performing an ARS gain control mode in the ARS control mode that are set in the controller (104 in FIG. 1) to employ an ARS compensation gain value.

In the third determination S1007a, the controller (104 in FIG. 1) may determine whether the vehicle speed value is a lower speed range value corresponding to the target vehicle speed value, and the steering speed value is a lower steering speed range value corresponding to the target steering speed value.

In the first control S1007b, the controller (104 in FIG. 1), in response to determining the vehicle speed value to be a lower speed range value corresponding to the target vehicle speed value, and the steering speed value to be a lower steering speed range value corresponding to the target steering speed value, may be configured to control a response command for determining the deadband period by using an ARS compensation gain value corresponding to the lower speed range value and the lower steering speed range value and set to be smaller than an original ARS gain value.

On the other hand, in the first control S1007c, the controller (104 in FIG. 1), in response to determining the vehicle speed value to be a high-speed range value corresponding to the target vehicle speed value, and the steering speed value to be a higher steering speed range value corresponding to the target steering speed value, may be configured to control a response command for determining the deadband period by using an ARS compensation gain value corresponding to the higher speed range value and the higher steering speed range value and set to be larger than an original ARS gain value.

For example, in the first control S1007c, the controller (104 in FIG. 1), in response to determining that the vehicle speed value to be a higher speed range value corresponding to a target vehicle speed value, and the steering speed value to be a higher steering speed range value corresponding to a target steering speed value (TSS1-1, TSS1-2, or TSS1-3 in FIG. 6), may be further configured to control a response command R4, R5, or R6 for determining the deadband period by using an ARS compensation gain value (CG2-1, CG2-2, or CG2-3 in FIG. 6) corresponding to the higher speed range and the higher steering speed range value and set to be larger than an original ARS gain value in the determination of the deadband period during a period from t18 to t19, a period from t19 to t20, or a period from t21 to t22.

In this case, in the first control S1007c, the controller 104 may control rapid response commands R4 and R6 for determining the deadband period.

The vehicle control method 700, 800, 900 or 1000 of the vehicle control apparatus (100 in FIG. 1) according to the embodiment of the present invention may further include second control (S710, S810, S910, or S1010).

In the second control S710, S810, S910, or S1010, the controller (104 in FIG. 1) may be further configured to control the actuator (30b in FIG. 1) to generate a torque in the stabilizer bar (30a in FIG. 1) according to the calculated target torque value (TAT1 in FIG. 2) with the torque value (CT1 in FIG. 2) tracing the calculated target torque value (TAT1 in FIG. 2).

Figure 11:
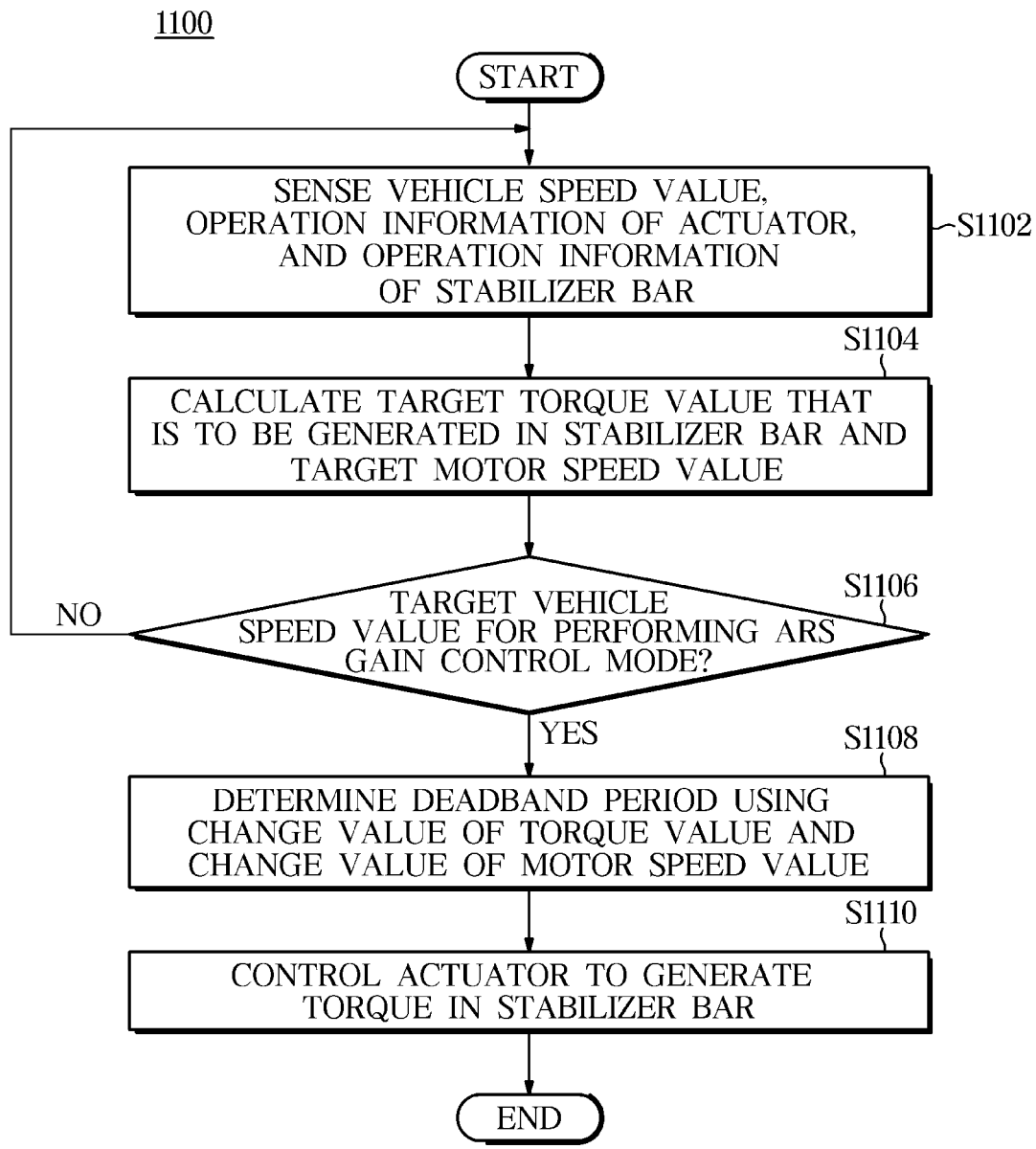
FIG. 11 is a flowchart showing another example of a vehicle control method for a vehicle control apparatus according to an embodiment of the present invention.
Figure 12:
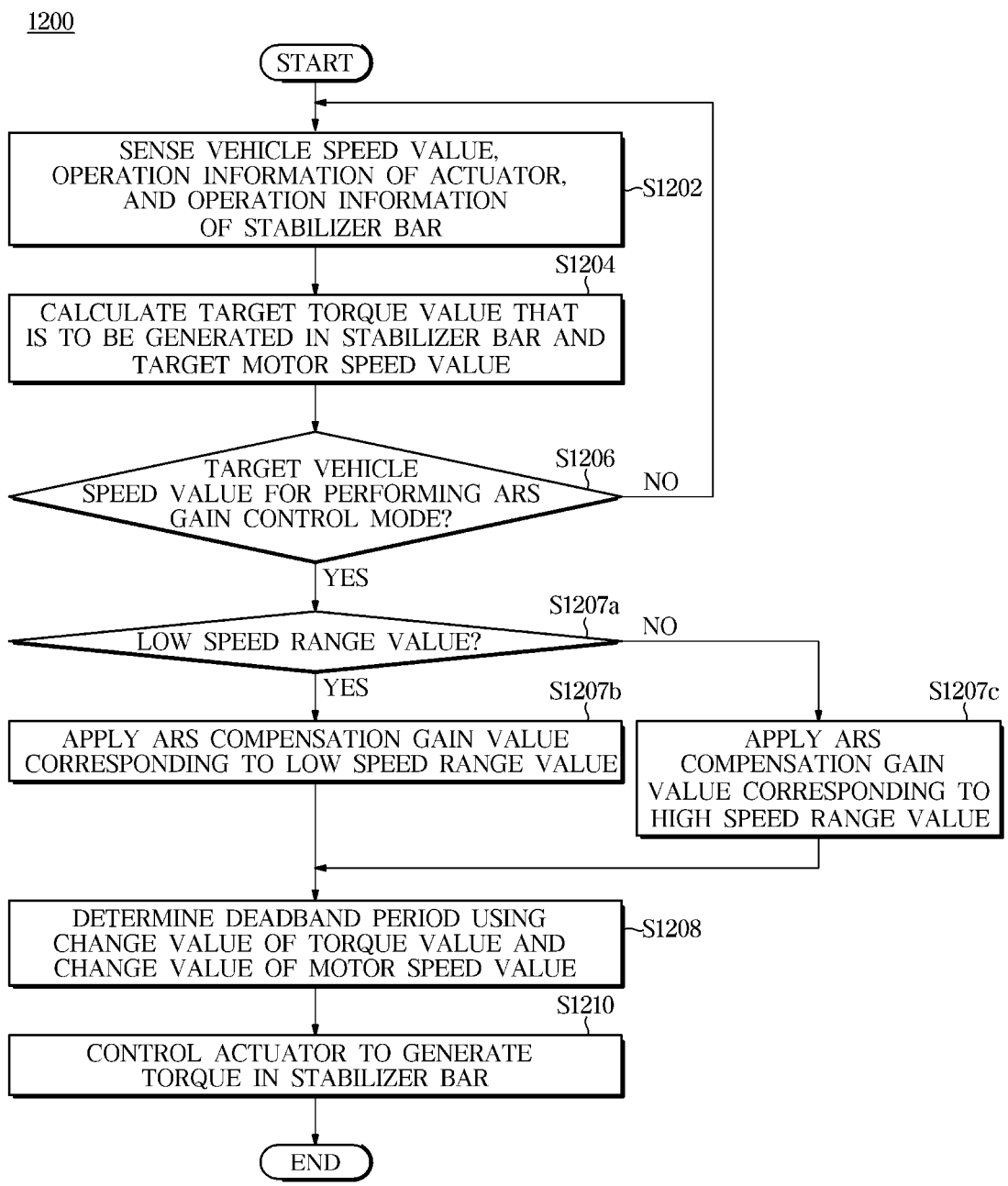
FIG. 12 is a flowchart showing another example of a vehicle control method for a vehicle control apparatus according to an embodiment of the present invention.

FIG. 11 is a flowchart showing another example of a vehicle control method for a vehicle control apparatus according to an embodiment of the present invention, and FIG. 12 is a flowchart showing another example of a vehicle control method for a vehicle control apparatus according to an embodiment of the present invention.

Figure 13:
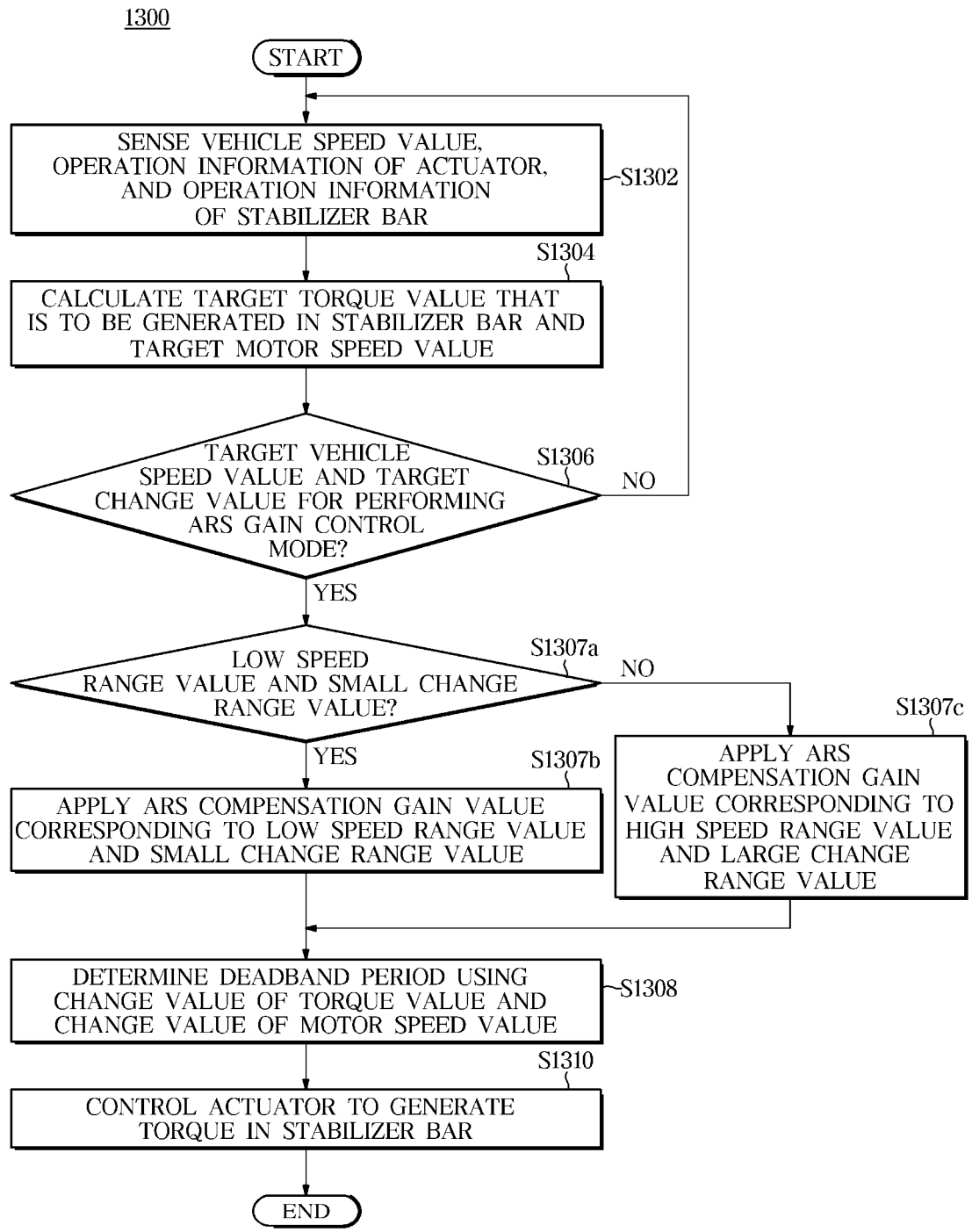
FIG. 13 is a flowchart showing another example of a vehicle control method for a vehicle control apparatus according to an embodiment of the present invention.
Figure 14:
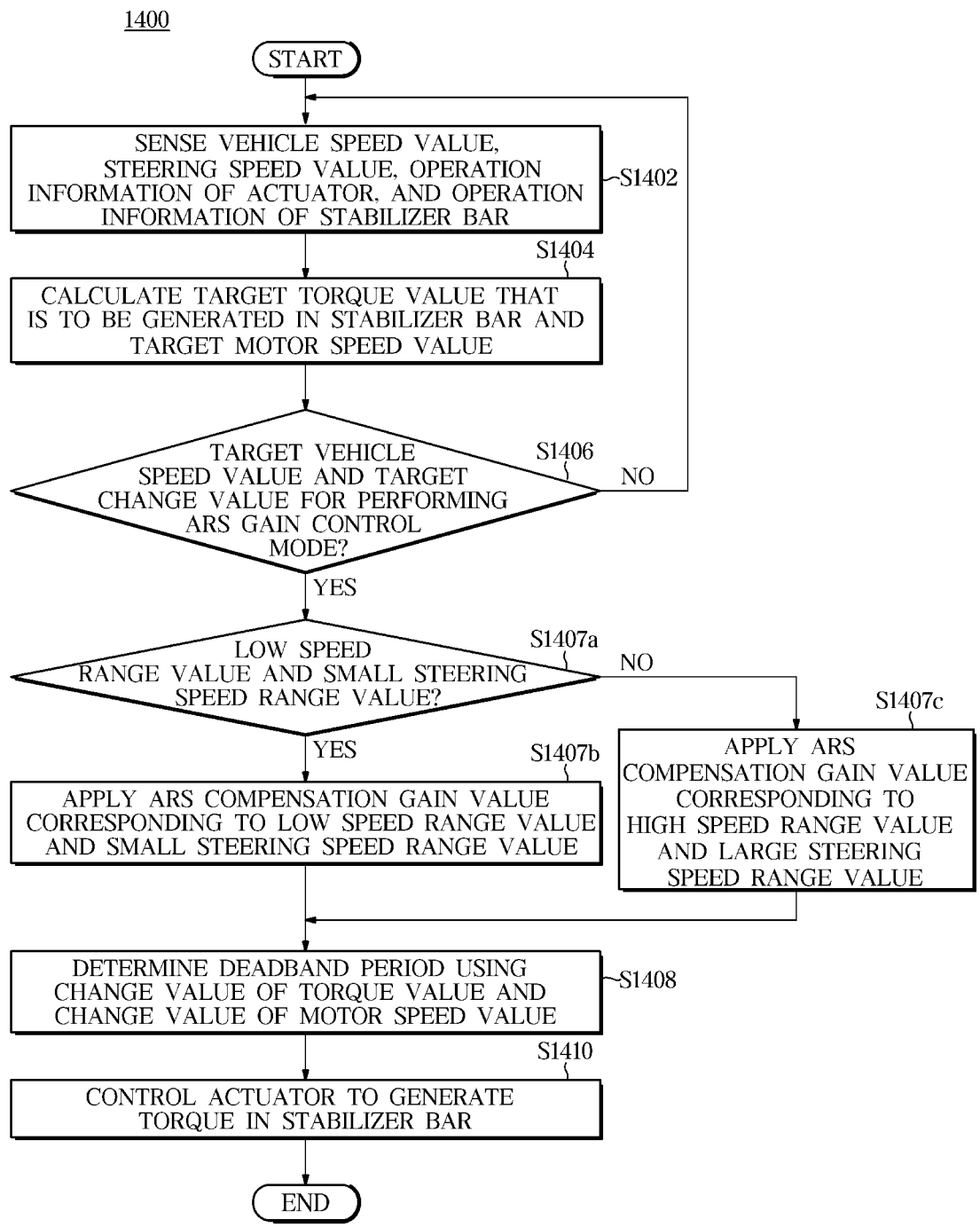
FIG. 14 is a flowchart showing another example of a vehicle control method for a vehicle control apparatus according to an embodiment of the present invention.

FIG. 13 is a flowchart showing another example of a vehicle control method for a vehicle control apparatus according to an embodiment of the present invention, and FIG. 14 is a flowchart showing another example of a vehicle control method for a vehicle control apparatus according to an embodiment of the present invention.

Referring to FIGS. 11 to 14, the vehicle control method (1100, 1200, 1300, or 1400) of the vehicle control apparatus (100 in FIG. 1) according to the embodiment of the present invention includes sensing (S1102, S1202, S1302, or S1402), calculating (S1104, S1204, S1304, or S1404), first determination (S1106, S1206, S1306 or S1406), and second determination (S1108, S1208, S1308 or S1408).

In the sensing S1102, S1202, S1302, or S1402, the sensor (102 in FIG. 1) senses a vehicle speed value, and senses operation information of the actuator 30b for generating a torque in a stabilizer bar 30a of an active roll stabilizer (ARS) 30 and operation information of the stabilizer bar 30a

In the calculation S1104, S1204, S1304, or S1404, the controller (104 in FIG. 1) calculates a target torque value that is to be generated in the stabilizer bar (30a in FIG. 1) and a target motor speed value on the basis of the vehicle speed value sensed by the sensor (102 in FIG. 1), the operation information of the actuator (30b in FIG. 1) sensed by the sensor (102 in FIG. 1), and the operation information of the stabilizer bar (30a in FIG. 1) sensed by the sensor (102 in FIG. 1).

In the first determination S1106, S1206, S1306, or S1406, the controller (104 in FIG. 1) determines whether the vehicle speed value sensed by the sensor (102 in FIG. 1) is a target vehicle speed value to perform an ARS control mode that is set in the controller (104 in FIG. 1).

In the second determination S1108, S1208, S1308, or S1408, the controller (104 in FIG. 1) in response to determining the vehicle speed value to be the target vehicle speed. may determine a deadband period in which a torque of the actuator (30b in FIG. 1) is not transmitted, using change values (CT2-1 to CT2-3, and CT3-1 and CT3-2 in FIGS. 3 and 4) of torque values (CT2 and CT3 in FIGS. 3 and 4) and change values (CMS1-1 to CMS1-3, and CMS2-1 and CMS2-2 in FIGS. 3 and 4) of motor speed values (CMS1 and CMS2 in FIGS. 3 and 4) while the torque values (CT2 and CT3 in FIGS. 3 and 4) and the motor speed values (CMS1 and CMS2 in FIGS. 3 and 4) are tracing the target torque values (TAT2 and TAT3 in FIGS. 3 and 4) and the target motor speed values (TMS1 and TMS2 in FIGS. 3 and 4) calculated by the controller (104 in FIG. 4).

For example, in the second determination S1108, S1208, S1308 and S1408, in response to determining that change values (CT2-1, CT2-2, and CT2-3 in FIG. 3) of the torque value (CT2 in FIG. 3) are greater than change values (TAT2-1, TAT2-2, and TAT2-3 in FIG. 3) of the target torque value (TAT2 in FIG. 3), respectively, while change values (CMS1-1, CMS1-2, and CMS1-3 in FIG. 3) of the motor speed value (CMS1 in FIG. 3) are greater than change values (TMS1-1, TMS1-2, and TMS1-3 in FIG. 3) of the target motor speed value (TMS1 in FIG. 3), respectively, during a predetermined period of time, the controller (104 in FIG. 1) may determine a period from t3 to t4, a period from t5 to t6, and a period from t7 to t8 to be a deadband period in which a torque of the actuator 30b is not transmitted.

As another example, in the second determination S1108, S1208, S1308, and S1408, in response to determining that difference values (DV1 and DV2 in FIG. 4) between change values (CT3-1 and CT3-2 in FIG. 4) of a torque value (CT3 in FIG. 4) and change values (TAT3-1 and TAT3-2 in FIG. 4) of a target torque value (TAT3 in FIG. 4) are each greater than a corresponding reference value, while change values (CMS2-1 and CMS2-2 in FIG. 4) of a motor speed value (CMS2 in FIG. 4) are greater than change values (TMS2-1 and TMS2-2 in FIG. 4) of a target motor speed value (TMS2 in FIG. 4) during a predetermined period of time, the controller 104 may determine a period from t9 to t10 and a period from t11 to t12 to be a deadband period in which a torque of the actuator (30b in FIG. 1) is not transmitted.

Referring to FIG. 12, the vehicle control method 1200 of the vehicle control apparatus (100 in FIG. 1) according to the embodiment of the present invention may further include third determination (S1207a) and first control (S1207b or S1207c).

In this case, in the first determination step S1206, the controller (104 in FIG. 1) may further determine whether the vehicle speed value sensed by the sensing (102 in FIG. 1) is a target vehicle speed value for performing an ARS gain control mode in the ARS control mode that is set in the controller (104 in FIG. 1) to employ an ARS compensation gain value.

Here, in the third determination S1207a, the controller (104 in FIG. 1) may determine whether the vehicle speed value is a lower speed range value corresponding to the target vehicle speed value.

In this case, in the first control S1207b, the controller (104 in FIG. 1), in response to determining that the vehicle speed value is a lower speed range value corresponding to the target vehicle speed value, may be configured to control a response command for determining the deadband period by using an ARS compensation gain value corresponding to the lower speed range value and set to be smaller than an original ARS gain value in the determination of the deadband period.

On the other hand, in the first control S1207c, the controller (104 in FIG. 1) in response to determining that the vehicle speed value is a higher speed range value corresponding to the target vehicle speed value, may be configured to control a response command for determining the deadband period by using an ARS compensation gain value corresponding to the higher speed range value and set to be larger than an original ARS gain value in the determination of the deadband period.

Referring to FIGS. 13, the vehicle control method 1300 of the vehicle control apparatus (100 of FIG. 1) according to the embodiment of the present invention may further include third determination (S1307a) and first control (S1307b or S1307c).

In this case, in the first determination S1306, the controller (104 in FIG. 1) may further determine whether the vehicle speed value sensed by the sensor (102 in FIG. 1) and the change value of the calculated target torque value are a target vehicle speed value and a target change value for performing an ARS gain control mode in the ARS control mode that are set in the controller (104 in FIG. 1) to employ.

Here, in the third determination S1307a, the controller (104 in FIG. 1) may determine whether the vehicle speed value is a lower speed range value corresponding to the target vehicle speed, and the change value of the target torque value is a small change range value corresponding to the target change value.

In this case, in the first control S1307b, the controller (104 in FIG. 1), in response to determining that the vehicle speed value is a lower speed range value corresponding to the target vehicle speed, and the change value of the target torque value is a small change range value corresponding to the target change value, may be further configured to control a response command for determining the deadband period by using an ARS compensation gain value corresponding to the lower speed range value and the small change range value and set to be smaller than an original ARS gain value.

On the other hand, in the first control S1307c, the controller (104 in FIG. 1), in response to determining that the vehicle speed value is a higher speed range value corresponding to the target vehicle speed, and the change value of the target torque value is a large change range value corresponding to the target change value, may be further configured to control a response command for determining the deadband period by using an ARS compensation gain value corresponding to the higher speed range value and the large change range value and set to be larger than an original ARS gain value.

For example, in the first control S1307c, the controller (104 in FIG. 1), in response to determining that a vehicle speed value is a higher speed range value corresponding to the target vehicle speed value, and a change values (TAT4-1, TAT4-2, or TAT4-3 in FIG. 5) of a target torque value (TAT4 in FIG. 5) is a large change range value corresponding to the target change value, may be further configured to control a response command R1, R2, or R3 for determining the deadband period by using an ARS compensation gain value (CG1-1, CG1-2, or CG1-3 in FIG. 5) corresponding to the higher speed range value and the large change range value and set to be larger than an original ARS gain value.

In this case, in the first control S1307c, the controller (104 in FIG. 1) may control rapid response commands (R1 and R3 in FIG. 5) for determining the deadband period.

Referring to FIG. 14, the vehicle control method 1400 of the vehicle control apparatus (100 in FIG. 1) according to the embodiment of the present invention may further include third determination (S1407a) and first control (S1407b or S1407c).

Here, in the sensing S1402, the sensor (102 in FIG. 1) may further sense a steering speed value.

In this case, in the first determination S1406, the controller (104 in FIG. 1) may further determine whether the vehicle speed value and the steering speed value sensed by the sensor (102 in FIG. 1) are a target vehicle speed value and a target steering speed value for performing an ARS gain control mode in the ARS control mode that are set in the controller (104 in FIG. 1) to employ an ARS compensation gain value.

Here, in the third determination S1407a, the controller (104 in FIG. 1) may determine whether the vehicle speed value is a lower speed range value corresponding to the target vehicle speed value, and the steering speed value is a lower steering speed range value corresponding to the target steering speed value.

In this case, in the first control S1407b, the controller (104 in FIG. 1), in response to determining that the vehicle speed value is a lower speed range value corresponding to the target vehicle speed value, and the steering speed value is a lower steering speed range value corresponding to the target steering speed value, may be configured to control a response command for determining the deadband period by using an ARS compensation gain value corresponding to the lower speed range value and the lower steering speed range value and set to be smaller than an original ARS gain value.

On the other hand, the controller (104 in FIG. 1), in response to determining that the vehicle speed value is a higher speed range value corresponding to the target vehicle speed value, and the steering speed value is a higher steering speed range value corresponding to the target steering speed value, may be configured to control a response command for determining the deadband period by using an ARS compensation gain value corresponding to the higher speed range value and the higher steering speed range value and set to be larger than an original ARS gain value.

For example, in the first control S1407c, the controller (104 in FIG. 1), in response to determining that the vehicle speed value is a higher speed range value corresponding to a target vehicle speed value, and the steering speed value is a higher steering speed range value corresponding to a target steering speed value (TSS1-1, TSS1-2, or TSS1-3 in FIG. 6), may be further configured to control a response command (R4, R5, or R6 in FIG. 6) for determining the deadband period by using an ARS compensation gain value (CG2-1, CG2-2, or CG2-3 in FIG. 6) corresponding to the higher speed range value and the higher steering speed range value and set to be larger than an original ARS gain value in the determination of the deadband period during a period from t18 to t19, a period from t19 to t20, and a period from t21 to t22.

In this case, in the first control S1407c, the controller (104 in FIG. 1) may control the rapid response commands (R4 and R6 in FIG. 6) for determining the deadband period.

The vehicle control method (1100, 1200, 1300, or 1400) of the vehicle control apparatus (100 in FIG. 1) according to the embodiment of the present invention may further include second control (S1110, S1210, S1310, or S1410).

In the second control S1110, S1210, S1310, or S1410, the controller (104 in FIG. 1) may further control the actuator (30b in FIG. 1) to generate a torque in the stabilizer bar (30a in FIG. 1) according to the target torque values (TAT2 and TAT3 in FIGS. 3 and 4) and the target motor speed values (TMS1 and TMS 2 in FIGS. 3 and 4) calculated by the controller (104 in FIG. 1) with the torque values (CT2 and CT3 in FIGS. 3 and 4) and the motor speed values (CMS1 and CMS2 in FIGS. 3 and 4) tracing the target torque values (TAT2 and TAT3 in FIGS. 3 and 4) and the target motor speed values (TMS1 and TMS 2 in FIGS. 3 and 4).

Figure 15:
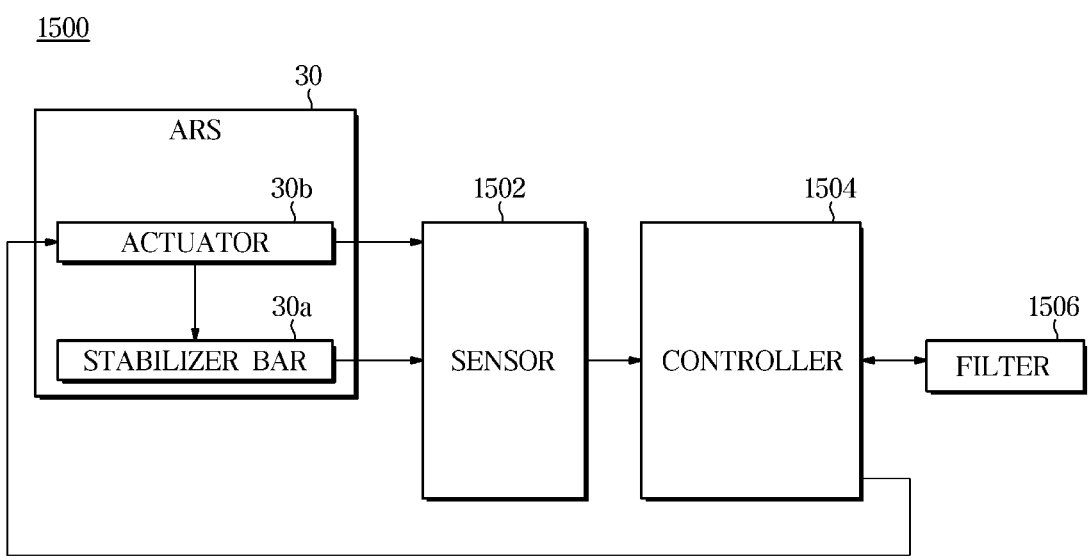
FIG. 15 is a block diagram illustrating an example of a vehicle control apparatus according to an embodiment of the present invention.
Figure 16:
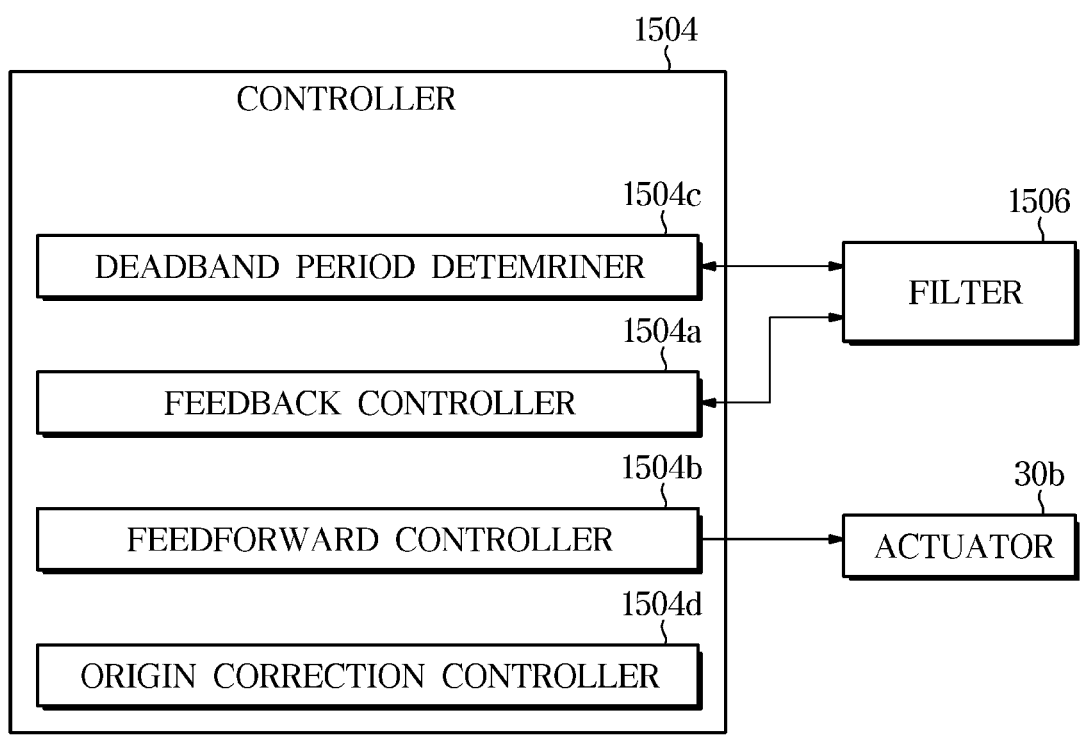
FIG. 16 is a block diagram illustrating an example of a controller shown in FIG. 15.

FIG. 15 is a block diagram illustrating an example of a vehicle control apparatus according to an embodiment of the present invention, and FIG. 16 is a block diagram illustrating an example of a controller shown in FIG. 15.

Figure 17:
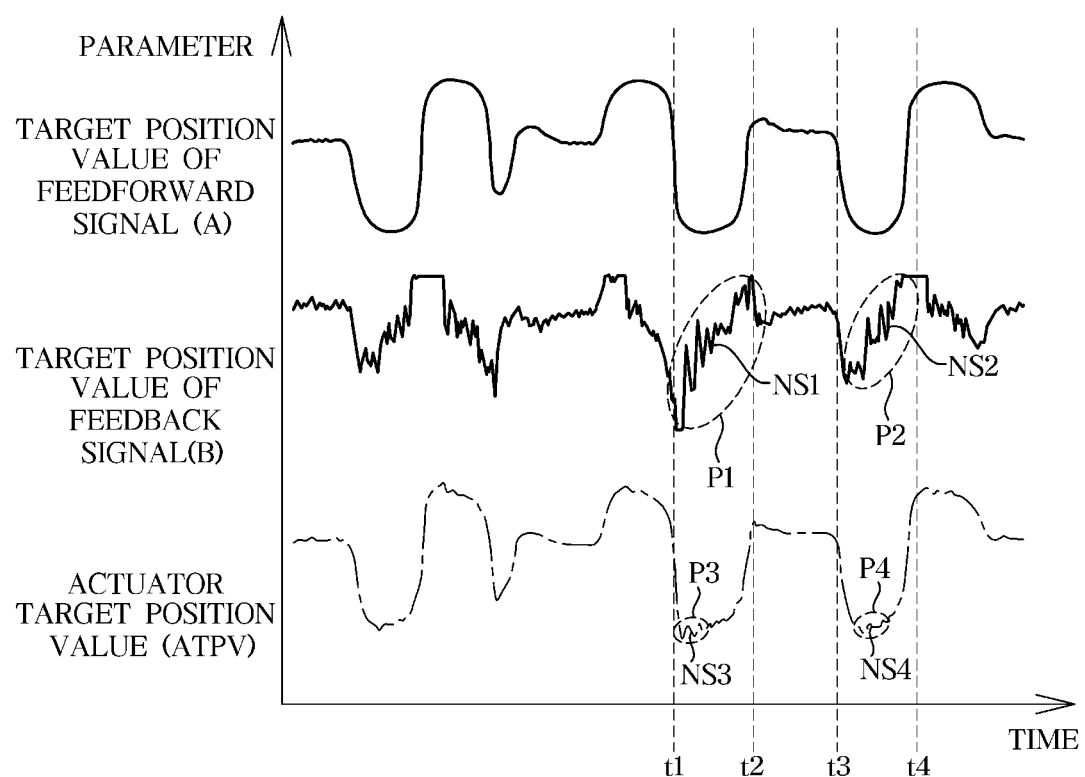
FIG. 17 is a block diagram illustrating an example in which an actuator target position value including a noise signal is calculated on the basis of a feedback signal target position value including a noise signal by the conventional vehicle control apparatus for controlling an ARS.

FIG. 17 is a block diagram illustrating an example in which an actuator target position value including a noise signal is calculated on the basis of a feedback signal target position value including a noise signal by the conventional vehicle control apparatus for controlling an ARS.

Figure 18:
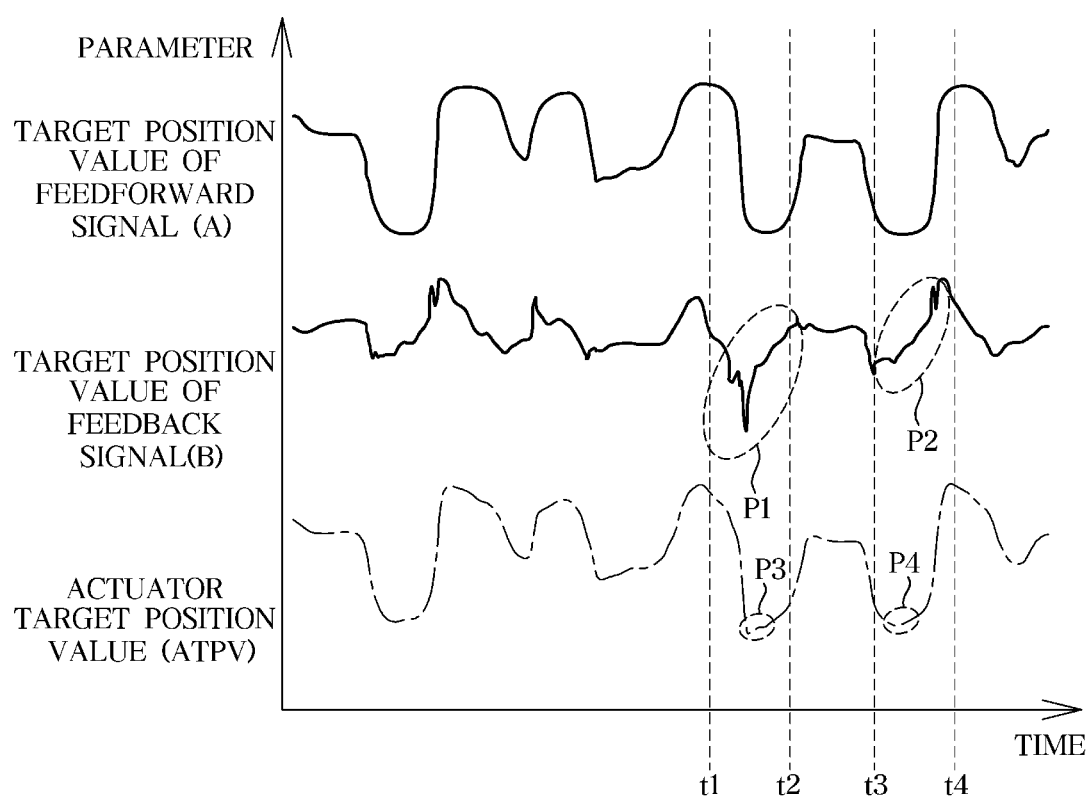
FIG. 18 is a block diagram illustrating an example in which a noise-signal removed actuator target position value is calculated on the basis of a noise-signal removed feedback signal dependent target position value by a calculator shown in FIGS. 15 and 16.

FIG. 18 is a block diagram illustrating an example in which a noise-signal removed actuator target position value is calculated on the basis of a noise signal removed feedback signal dependent target position value by a calculator shown in FIGS. 15 and 16.

Referring to FIGS. 15 to 18, a vehicle control apparatus 1500 according to an embodiment of the present invention includes a sensor 1502, a controller 1504, and a filter 1506.

The sensor 1502 senses a steering angle value, operation information of an actuator 30b for generating a torque in a stabilizer bar 30a of an active roll stabilizer ARS 30, and operation information of the stabilizer bar 30a.

The controller 1504 calculates a target torque value that is to be generated in the stabilizer bar 30a on the basis of the steering angle value sensed by the sensor 1502, the operation information of the actuator 30b sensed by the sensor 1502, and the operation information of the stabilizer bar 30a sensed by the sensor 1502.

The controller 1504 may include a feedback controller 1504a.

In this case, the controller 1504 may determine whether the steering angle value sensed by the sensor 1502 has no change when a feedback control is performed by the feedback controller 1504a according to the calculated target torque value such that a torque value traces the calculated target torque value.

The filter 1506, in response to the steering angle value determined to have no change by the controller 1504, is configured to remove a noise signal of a feedback signal according to a first filtering level set to perform a strong filtering on the feedback signal during the feedback control.

In addition, the filter 1506, in response to the steering angle value determined to have a change by the controller 1504, is configured to remove a noise signal of a feedback signal according to a second filtering level set to perform a weak filtering on the feedback signal during the feedback control.

For example, although not shown, the filter 1506 may adjust cut-off frequencies of a low pass filter (not shown) according to the first filtering level and the second filtering level, respectively, to remove a noise signal of the feedback signal.

The controller 1504 of the vehicle control apparatus 1500 according to the embodiment of the present invention may further include a feed forward controller 1504b.

In this case, the feedforward controller 1504b may be further configured to perform a feedforward control by outputting a feedforward signal such that an actuator drive command corresponding to a target torque value is applied in advance to operate the actuator 30b.

For example, although not shown, the feedforward controller 1504b may perform a feedforward control using an actuator drive command map (not shown) according to a target torque value of the actuator 30b.

In this case, the controller 1504 may be further configured to calculate an actuator target position value by adding a target position value of the feedback signal, in which a noise signal is removed according to one of the first filtering level and the second filtering level, together a target position value of the feedforward signal.

The controller 1504 of the vehicle control apparatus 1500 according to the embodiment of the present invention may further include a deadband period determiner 1504c.

Here, the deadband period determiner 1504c may be configured to determine a need for a rapid response in determining a deadband period in which a torque of the actuator 30b is not transmitted.

The filter 1506, in response to no need of the rapid response in determining the deadband period by the deadband period determiner 1504c, when the controller 1504 generates an actuator target position signal from the calculated actuator target position value, may be configured to remove a noise signal of the actuator target position signal according to a third filtering level that is set to perform a strong filtering on the actuator target position signal.

In addition, the filter 1506, in response to a need of the rapid response in determining the deadband period by the deadband period determiner 1504c, when the controller 1504 generates an actuator target position signal from the calculated actuator target position value, may be further configured to remove a noise signal of the actuator target position signal according to a fourth filtering level that is set to perform a weak filtering on the actuator target position signal.

For example, although not shown, the filter 1506 may adjust cut-off frequencies of a low pass filter (not shown) according to the third filtering level and the fourth filtering level, respectively, to remove a noise signal of the actuator target position signal.

The controller 1504 of the vehicle control apparatus 1500 according to the embodiment of the present invention may further include the deadband period determiner 1504c.

Here, the deadband period determiner 1504c may further determine a state of being a deadband period in which a torque of the actuator 30b is not transmitted, In this case, the filter 1506, in response to the deadband period not confirmed by the deadband period determiner 1504c, when the controller 1504 generates an actuator target position signal from the calculated actuator target position value, may be further configured to remove a noise signal of the actuator target position signal according to a fifth filtering level that is set to perform a strong filtering on the actuator target position signal.

In addition, the filter 1506, in response to the deadband period confirmed by the deadband period determiner 1504c, when the controller 1504 generates an actuator target position signal from the calculated actuator target position value, may be further configured to remove a noise signal of the actuator target position signal according to a sixth filtering level that is set to perform a weak filtering on the actuator target position signal.

For example, although not shown, the filter 1506 may adjust cut-off frequencies of a low pass filter (not shown) according to the fifth filtering level and the sixth filtering level, respectively, to remove a noise signal of the actuator target position signal.

Referring to FIGS. 15, 16 and 18, the vehicle control apparatus 1500 according to the embodiment of the present invention may allow the filter 1506 to remove a noise signal from a feedback signal according to the first filtering level that is set to perform a strong filtering on a feedback signal when the feedback controller 1504a performs a feedback control.

In this case, the controller 1504 adds a target position value B of the feedback signal, in which a noise signal is removed according to the first filtering level, together with a target position value A of a feedforward signal in region P1 from t1 to t2 and in region P2 from t3 to t4, to thereby calculate a noise signal removed actuator target position value ATPV in region P3 from t1 to t2 and region P4 from t3 to t4.

In other words, referring to in FIG. 17, the conventional vehicle control apparatus for controlling an ARS adds a target position value B of a feedback signal including a noise signal NS1 or NS2 in region P1 from t1 to t2 and region P2 from t3 to t4 together with a target position value A of a feedforward signal, to calculate an actuator target position value including the noise signal NS3 or NS4 in region P3 from t1 to t2 and region P4 from t3 to t4.

Since the vehicle control apparatus 1500 according to the embodiment of the present invention may efficiently remove the noise signal NS1 or NS2 of the feedback signal, the response performance for ARS operation is optimized than with the conventional ARS while vibration and noise generated during operation of an ARS are suppressed.

The controller 1504 of the vehicle control apparatus 1500 according to the embodiment of the present invention may further include an origin correction controller 1504d.

In this case, the origin correction controller 1504d may perform control to correct an origin of the actuator drive command, in which offset is required due to an external factor, and complete the control of correcting the origin of the actuator drive command.

For example, although not shown, the origin correction controller 1504d performs control to correct the origin of the actuator drive command in accordance with an offset value of the actuator drive command using a moving average filter (not shown),and complete the control of correcting the origin of the actuator drive command.

Figure 19:
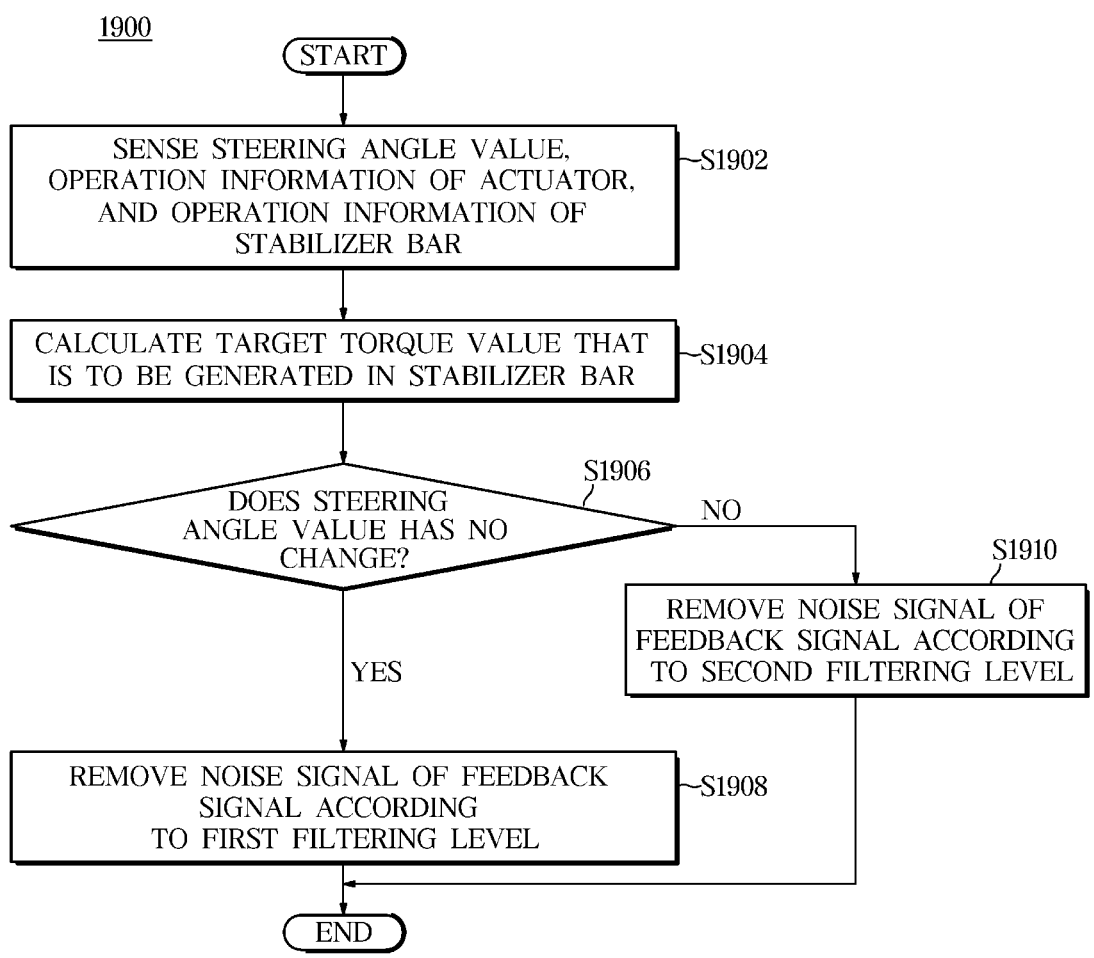
FIG. 19 is a flowchart showing an example of a vehicle control method for a vehicle control apparatus according to an embodiment of the present invention.
Figure 20:
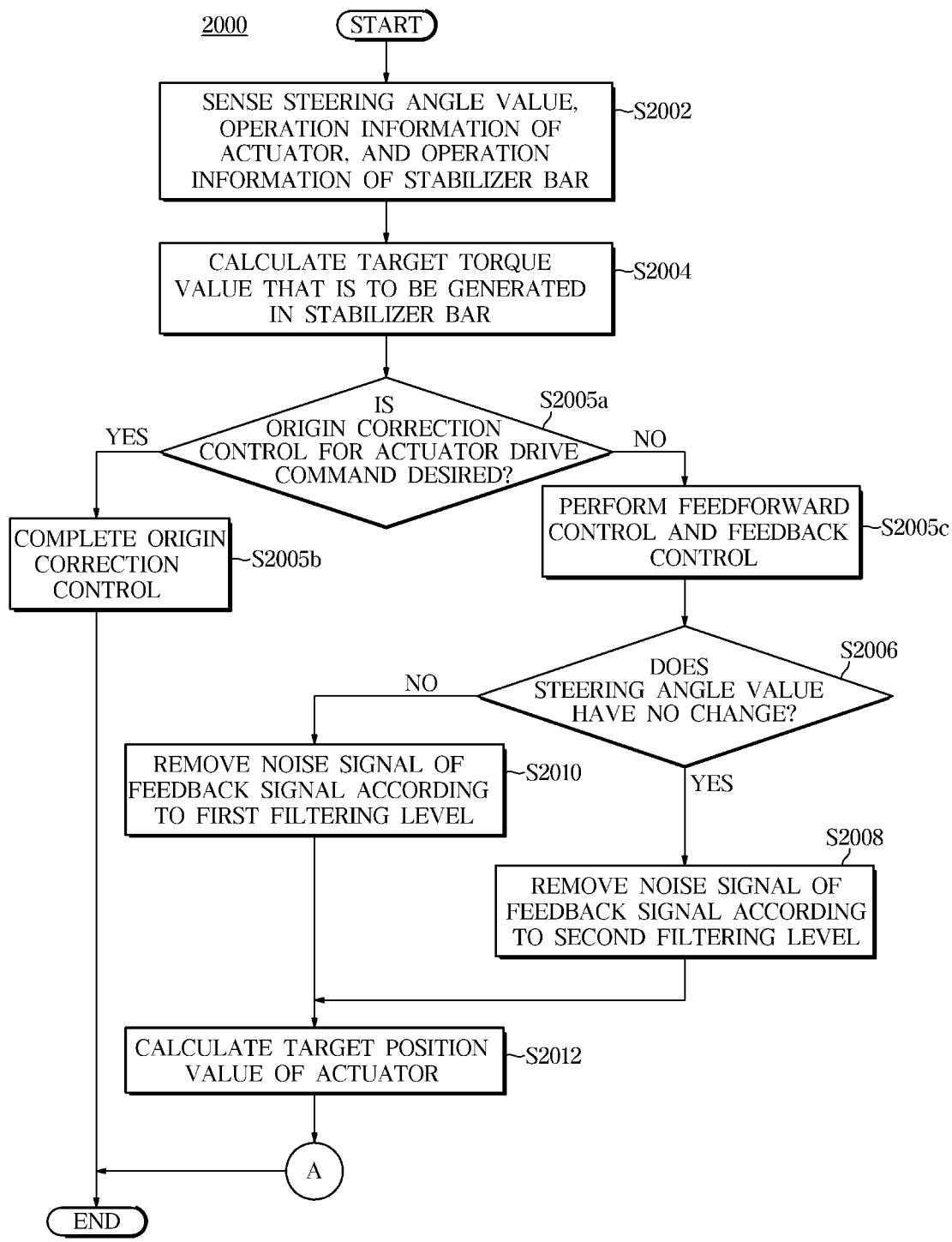
FIG. 20 is a flowchart showing another example of a vehicle control method for a vehicle control apparatus according to an embodiment of the present invention.

FIG. 19 is a flowchart showing an example of a vehicle control method for a vehicle control apparatus according to an embodiment of the present invention, and FIG. 20 is a flowchart showing another example of a vehicle control method for a vehicle control apparatus according to an embodiment of the present invention.

Figure 21:
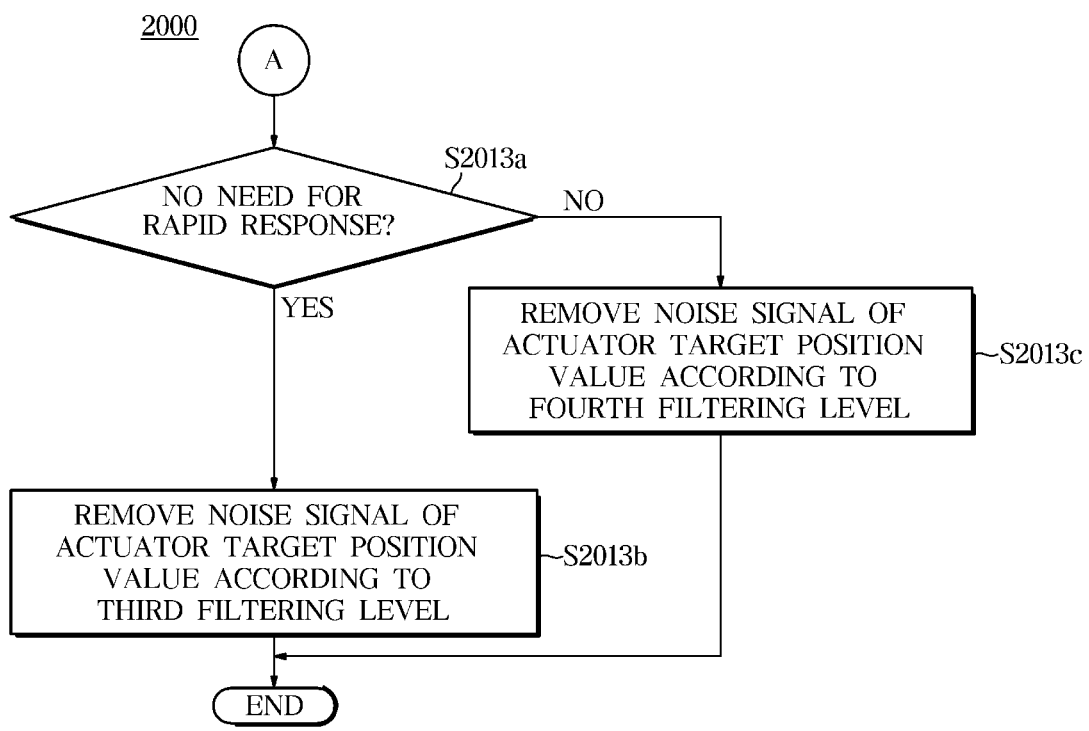
FIG. 21 is a flowchart showing another example of a vehicle control method for a vehicle control apparatus according to an embodiment of the present invention.
Figure 22:
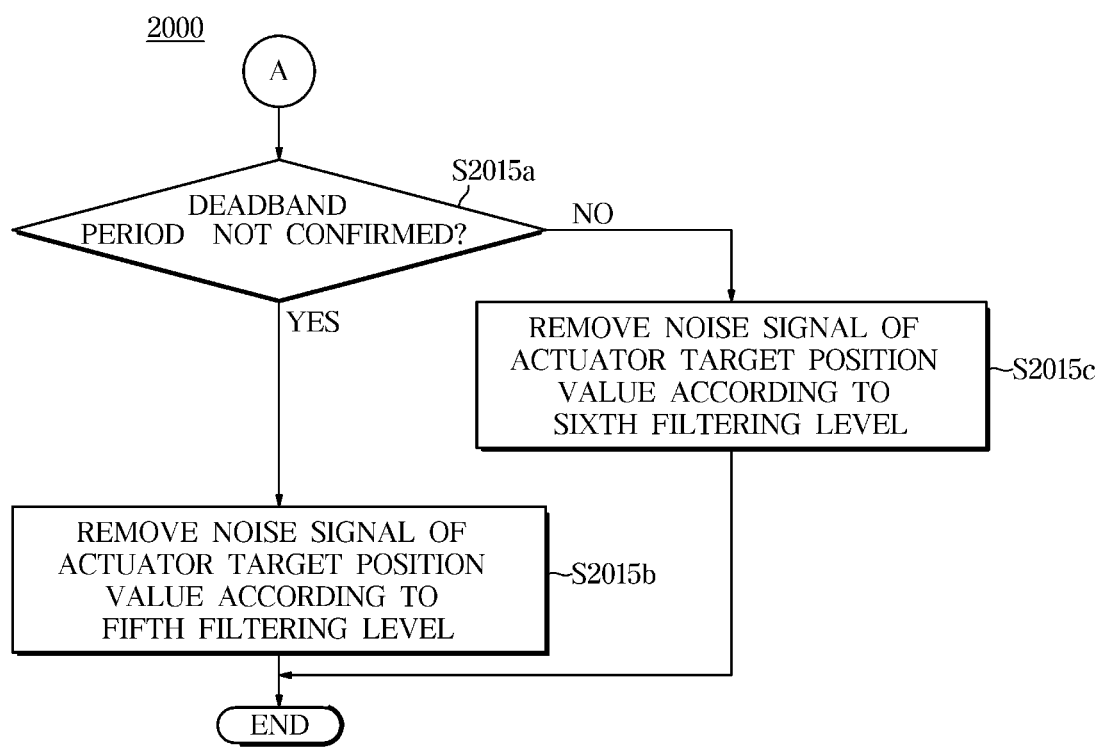
FIG. 22 is a flowchart showing another example of a vehicle control method for a vehicle control apparatus according to an embodiment of the present invention.

FIG. 21 is a flowchart showing another example of a vehicle control method for a vehicle control apparatus according to an embodiment of the present invention, and FIG. 22 is a flowchart showing another example of a vehicle control method for a vehicle control apparatus according to an embodiment of the present invention.

Referring to FIG. 19, the vehicle control method 1900 of the vehicle control apparatus (1500 in FIG. 15) according to the embodiment of the present invention includes sensing (S1902), first calculation (S1904), first determination (S1906), and first filtering (S1908).

In addition, the vehicle control method 1900 of the vehicle control apparatus (1500 in FIG. 15) according to the embodiment of the present invention may further include second filtering (S1910).

In the sensing S1902, the sensor (1502 in FIG. 15) senses a steering angle value, operation information of an actuator (30b in FIG. 15) for generating a torque in a stabilizer bar (30a in FIG. 15) of an active roll stabilizer ARS (30 in FIG. 15), and operation information of the stabilizer bar (30a in FIG. 15).

In the first calculation S1904, the controller (1504 in FIG. 15) calculates a target torque value that is to be generated in the stabilizer bar (30a in FIG. 15) on the basis of the steering angle value sensed by the sensor (1502 in FIG. 15), the operation information of the actuator (30b in FIG. 15) sensed by the sensor (1502 in FIG. 15), and the operation information of the stabilizer bar (30a in FIG. 15) sensed by the sensor (1502 in FIG. 15).

In the first determination S1906, the controller (1504 in FIG. 16) may determine whether the steering angle value sensed by the sensor (1502 in FIG. 15) has no change when a feedback control is performed by the feedback controller (1504a in FIG. 16) according to the target torque value calculated by the controller (1504 in FIG. 16) such that a torque value traces the calculated target torque value.

In the first filtering S1908, the filter (1506 in FIG. 16), in response to the steering angle value determined to have no change by the controller (1504 in FIG. 16), may be configured to remove a noise signal of a feedback signal according to a first filtering level set to perform a strong filtering on the feedback signal during the feedback control by the feedback controller (1504a in FIG. 16).

In the second filtering S1910, the filter (1506 in FIG. 16), in response to the steering angle value determined to have a change by the controller (1504 in FIG. 16), may be configured to remove a noise signal of a feedback signal according to a second filtering level set to perform a weak filtering on the feedback signal during the feedback control by the feedback controller (1504a in FIG. 16).

For example, in the first filtering S1908 and the second filtering S1910, the filter (1506 in FIG. 16) may adjust cut-off frequencies of a low pass filter (not shown) according to the first filtering level and the second filtering level, respectively, to remove a noise signal of the feedback signal.

Referring to FIGS. 20 to 22, the vehicle control method 2000 of the vehicle control apparatus (1500 in FIG. 15) according to the embodiment of the present invention includes sensing (S2002), first calculation (S2004), first determination (S2006), and first filtering (S2008).

In addition, the vehicle control method 2000 of the vehicle control apparatus (1500 in FIG. 15) according to the embodiment of the present invention may further include origin correction determination (S2005a), origin correction control (S2005b), and feedforward/feedback control (S2005c).

In addition, the vehicle control method 2000 of the vehicle control apparatus (1500 in FIG. 15) according to the embodiment of the present invention may further include second filtering (S2010).

In addition, the vehicle control method 2000 of the vehicle control apparatus (1500 in FIG. 15) according to the embodiment of the present invention may further include second calculation (S2012).

In the sensing S2002, the sensor (1502 in FIG. 15) senses a steering angle value, and senses operation information of an actuator (30b in FIG. 15) for generating a torque in a stabilizer bar (30a in FIG. 15) of an active roll stabilizer ARS (30 in FIG. 15), and operation information of the stabilizer bar (30a in FIG. 15).

In the first calculation S2004, the controller (1504 in FIG. 15) calculates a target torque value that is to be generated in the stabilizer bar (30a in FIG. 15) on the basis of the steering angle value sensed by the sensor (1502 in FIG. 15), the operation information of the actuator (30b in FIG. 15) sensed by the sensor (1502 in FIG. 15), and the operation information of the stabilizer bar (30a in FIG. 15) sensed by the sensor (1502 in FIG. 15).

In the origin correction determination S2005a, the origin correction controller (1054d in FIG. 16) may determine a need to perform control for correcting an origin of an actuator drive command, in which offset is required due to an external factor.

In the origin correction control S2005b, the origin correction controller (1054d in FIG. 16), in response to determining that the control for correcting the origin of the actuator drive command is to be performed, may complete the control for correcting the origin of the actuator drive command.

In the feedforward/feedback control S2005c, in response to determining that the control for correcting the origin of the actuator drive command is not to be performed by the origin correction controller (1054d in FIG. 16), the feedforward controller (1504b in FIG. 16) may perform a feedforward control by outputting a feedforward signal such that an actuator drive command corresponding to a target torque value is applied in advance to operate the actuator (30b in FIG. 16).

In addition, in the feedforward/feedback control S2005c, the feedback controller (1504a in FIG. 16) may perform a feedback control according to a target torque value calculated by the controller (1504 in FIG. 16) such that a torque value traces the target torque value.

In the first determination S2006, the controller (1504 in FIG. 16) may determine whether the steering angle value sensed by the sensor (1502 in FIG. 15) has no change when a feedback control is performed by the feedback controller (1504a in FIG. 16) according to the target torque value calculated by the controller (1504 in FIG. 16) such that a torque value traces the calculated target torque value.

In the first filtering S2008, the filter (1506 in FIG. 16), in response to no change of the steering angle value determined by the controller (1504 in FIG. 16), may be configured to remove a noise signal of a feedback signal according to a first filtering level set to perform a strong filtering on the feedback signal during the feedback control by the feedback controller (1504a in FIG. 16).

In the second filtering S2010, the filter (1506 in FIG. 16), in response to a change of the steering angle value determined by the controller (1504 in FIG. 16), may be configured to remove a noise signal of a feedback signal according to a second filtering level set to perform a weak filtering on the feedback signal during the feedback control by the feedback controller (1504a in FIG. 16).

For example, in the first filtering S2008 and the second filtering S2010, the filter (1506 in FIG. 16) may adjust cut-off frequencies of a low pass filter (not shown) according to the first filtering level and the second filtering level, respectively, to remove a noise signal of the feedback signal.

In the second calculation S2012, the controller (1504 in FIG. 16) may be further configured to calculate an actuator target position value by adding a target position value of the feedback signal, in which a noise signal is removed according to one of the first filtering level and the second filtering level, together with a target position value of the feedforward signal.

Referring to FIG. 21, the vehicle control method 2000 of the vehicle control device (1500 in FIG. 15) according to the embodiment of the present invention may further include second determination (S2013a), third filtering (S2013b), and fourth filtering (S2013c).

In the second determination S2013a, the deadband period determiner (1504c in FIG. 16) may be configured to determine a need for a rapid response in determining a deadband period in which a torque of the actuator (30b in FIG. 16) is not transmitted.

In the third filtering S2013b, the filter (1506 in FIG. 16), in response to no need of the rapid response in determining the deadband period by the deadband period determiner 1504c, when the controller (1504 in FIG. 16) generates an actuator target position signal from the actuator target position value calculated by the controller (1504 in FIG. 16), may be configured to remove a noise signal of the actuator target position signal according to a third filtering level that is set to perform a strong filtering on the actuator target position signal.

In the fourth filtering S2013c, the filter 1506, in response to a need of the rapid response in determining the deadband period by the deadband period determiner (1504c in FIG. 16), when the controller (1504 in FIG. 16) generates an actuator target position signal from the actuator target position value calculated by the controller (1504 in FIG. 16), may be configured to remove a noise signal of the actuator target position signal according to a fourth filtering level that is set to perform a weak filtering on the actuator target position signal.

For example, in the third filter S2013b and the fourth filtering S2013C, the filter (1506 in FIG. 16) may adjust cut-off frequencies of a low pass filter (not shown) according to the third filtering level and the fourth filtering level, respectively, to remove a noise signal of the actuator target position signal.

Referring to FIG. 22, the vehicle control method 2000 of the vehicle control apparatus (1500 in FIG. 15) according to the embodiment of the present invention may further include third determination (S2015a), fifth filtering (S2015b), and sixth filtering (S2015c).

In the third determination S2015a, the deadband period determiner (1504c in FIG. 16) may further determine a state of being a deadband period in which a torque of the actuator (30b in FIG. 16) is not transmitted.

In the fifth filtering S2015*b*, the filter (1506 in FIG. 16), in response to the deadband period not confirmed by the deadband period determiner (1504*c* in FIG. 16), when the controller (1504 in FIG. 16) generates an actuator target position signal from the actuator target position value calculated by the controller (1504 in FIG. 16), may be further configured to remove a noise signal of the actuator target position signal according to a fifth filtering level that is set to perform a strong filtering on the actuator target position signal.

In the sixth filtering S2015*c*, the filter (1506 in FIG. 16), in response to the deadband period confirmed by the deadband period determiner (1504*c* in FIG. 16), when the controller (1504 in FIG. 16) generates an actuator target position signal from the actuator target position value calculated by the controller (1504 in FIG. 16), may be further configured to remove a noise signal of the actuator target position signal according to a sixth filtering level that is set to perform a weak filtering on the actuator target position signal.

For example, in the fifth filtering S2015*b* and the sixth filtering S2015*c*, the filter (1506 in FIG. 16) may adjust cut-off frequencies of a low pass filter (not shown) according to the fifth filtering level and the sixth filtering level, respectively, to remove a noise signal of the actuator target position signal.

Meanwhile, the controllers 104 and 1504 of the vehicle control apparatuses 100 and 1500 according to the embodiment of the present invention may be implemented using an electronic control unit (ECU, not shown) or a micro control unit (MCU, not shown) for controlling, determining, and calculation the overall operation of the vehicle and remove a noise signal.

In addition, the implementation of the controllers 104 and 1504 is not limited thereto, and the controllers 104 and 1504 may include all types of control units, determination units, calculation units, and filtering units as long as they can control, determine, and calculate the overall operation of the vehicle and remove noise signals.

The controller 104 or 1504 of the vehicle control apparatus 100 or 1500 according to the embodiment of the present invention may employ an interpolation method to reduce the heterogeneity by linearly changing the ARS compensation gain value.

The sensor 102 of the vehicle control apparatus 100 according to the embodiment of the present invention may include a vehicle speed sensor (not shown) for sensing a vehicle speed value.

In this case, the operation information of the actuator 30*b* may be motor position operation information of the actuator 30*b*, and the operation information of the stabilizer bar 30*a* may be torsion operation information of the stabilizer bar 30*a*.

Here, although not shown, the sensor 102 may include a motor position sensor (not shown) for sensing the motor position operation information of the actuator 30*b*, and a strain gauge (not shown) for sensing the torsion motion information of the stabilizer bar 30*a*.

In this case, the twist motion information may be a torsional moment value and a rotation angle value, which correspond to a torque value of the stabilizer bar 30*a*.

In addition, the sensor 1502 may include a steering angle sensor (not shown) for sensing a steering angle value.

The vehicle control apparatus 100 according to the embodiment of the present invention may allow the sensor 102 to sense at least one of a steering angle value, a longitudinal acceleration value, a lateral acceleration value, and a yaw rate value, and may allow the controller 104 to calculate a target torque value to be generated in the stabilizer bar 30*a* on the basis of the at least one of the steering angle value, the longitudinal acceleration value, the lateral acceleration value, and the yaw rate value sensed by the sensor 102, and determine the deadband period on the basis of on the target torque value calculated by the controller 104.

The vehicle control apparatus 1500 according to the embodiment of the present invention may allow the sensor 1502 to sense at least one of a vehicle speed value, a longitudinal acceleration value, a lateral acceleration value, and a yaw rate value, allow the controller 1504 to calculate a target torque value that is to be generated in the stabilizer bar 30*a* on the basis of the at least one of the vehicle speed value, the longitudinal acceleration value, the lateral acceleration value, and the yaw rate value sensed by the sensor 1502.

In addition, the vehicle control apparatus 1500 according to the embodiment of the present invention may further determine existence of a change in the vehicle speed value, the longitudinal acceleration value, the lateral acceleration value, and the yaw rate value.

As such, the vehicle control apparatus 100 and the vehicle control method 700 according to the embodiment of the present invention may determine a deadband period in which a torque of the actuator 30*b* is not transmitted, using a change value and a change state of a torque value when the torque value traces a target torque value.

Accordingly, the vehicle control apparatus 100 and the vehicle control method 700 according to the embodiment of the present invention may efficiently determine a deadband period in which a torque of the actuator 30*b* is not transmitted.

In addition, the vehicle control apparatus 100 and the vehicle control method 1100 according to the embodiment of the present invention may determine a deadband period in which a torque of the actuator 30*b* is not transmitted, using a change value of a torque value and a change value of a motor speed value when the torque value and the motor speed value trace a target torque value and a target motor speed value, respectively.

Accordingly, the vehicle control apparatus 100 and the vehicle control method 1100 according to the embodiment of the present invention may efficiently determine the deadband period in which the torque of the actuator 30*b* is not transmitted.

In addition, the vehicle control apparatus 100 and the vehicle control methods 800 to 1000, and 1200 to 1400 according to the embodiments of the present invention may control a response command for determining a deadband period by applying an ARS compensation gain value in determining the deadband period.

Accordingly, the vehicle control apparatus 100 and the vehicle control methods 800 to 1000 and 1200 to 1400 according to the embodiment of the present invention may suppress the response delay in the deadband period in which the torque of the actuator 30*b* is not transmitted.

In addition, the vehicle control apparatus 1500 and the vehicle control methods 1900 and 2000 according to the embodiment of the present invention may reduce a noise signal of a feedback signal according to a first filtering level that is set to perform a strong filtering on a feedback signal in a feedback control, in response to no change in a steering angle value during the feedback control in which a torque value traces a target torque value.

In addition, the vehicle control apparatus 1500 and the vehicle control methods 1900 and 2000 according to the embodiment of the present invention may reduce a noise signal of a feedback signal according to a second filtering level that is set to perform a weak filtering on a feedback signal in a feedback control, in response to presence of a change in a steering angle value during the feedback control in which a torque value traces a target torque value.

Accordingly, the vehicle control apparatus 1500 and the vehicle control methods 1900 and 2000 according to the embodiment of the present invention may efficiently remove a noise signal of a feedback signal in performing the feedback control in which the torque value traces the target torque value.

Accordingly, the vehicle control apparatus 1500 and the vehicle control methods 1900 and 2000 according to the embodiment of the present invention may suppress vibration and noise generated in operation of the ARS 30 while maintaining the response performance for the operation of the ARS 30 in an optimum state.

The vehicle control apparatus 1500 and the vehicle control method 2000 according to the embodiment of the present invention may remove a noise signal of an actuator target position signal, which is generated from a calculated actuator target position value, according to a third filtering level that is set to perform a strong filtering on the actuator target position signal, in response to no need of a rapid response for determining a deadband period.

In addition, the vehicle control apparatus 1500 and the vehicle control method 2000 according to the embodiment of the present invention may remove a noise signal of an actuator target position signal, which is generated from a calculated actuator target position value, according to a fourth filtering level that is set to perform a strong filtering on the actuator target position signal, in response to a need of a rapid response for determining a deadband period.

Accordingly, the vehicle control apparatus 1500 and the vehicle control method 2000 according to the embodiment of the present invention may efficiently remove a noise signal of an actuator target position signal when generating an actuator target position signal from a calculated actuator target position value.

Accordingly, the vehicle control apparatus 1500 and the vehicle control method 2000 according to the embodiment of the present invention may suppress vibration and noise generated in operation of the ARS 30 while maintaining a response performance for the operation of the ARS 30 in an optimum state.

The vehicle control apparatus 1500 and the vehicle control method 2000 according to the embodiment of the present invention may remove a noise signal of an actuator target position signal, which is generated from a calculated actuator target position value, according to a fifth filtering level that is set to perform a strong filtering on the actuator target position signal, in response to a deadband period not confirmed.

In addition, the vehicle control apparatus 1500 and the vehicle control method 2000 according to the embodiment of the present invention may remove a noise signal of an actuator target position signal, which is generated from a calculated actuator target position value, according to a sixth filtering level that is set to perform a weak filtering on the actuator target position signal, in response to a deadband period confirmed.

Accordingly, the vehicle control apparatus 1500 and the vehicle control method 2000 according to the embodiment of the present invention may efficiently remove a noise signal of an actuator target position signal when generating an actuator target position signal from a calculated actuator target position value.

Accordingly, the vehicle control apparatus 1500 and the vehicle control method 2000 according to the embodiment of the present invention may suppress vibration and noise generated in operation of the ARS 30 in an optimum state while maintaining the response performance for the operation of the ARS 30.

As is apparent from the above, the vehicle control apparatus and the vehicle control method can efficiently determine a deadband period in which a torque of an actuator is not transmitted.

The vehicle control apparatus and the vehicle control method can suppress a response delay in a deadband period in which a torque of an actuator is not transmitted.

The vehicle control apparatus and the vehicle control method can maintain an optimum response performance for operation of an ARS.

The vehicle control apparatus and the vehicle control method can suppress vibration and noise generated during operation of an ARS.

What is claimed is:

1. A vehicle control apparatus comprising:
    a sensor configured to sense a vehicle speed value, operation information of an actuator for generating a torque in a stabilizer bar of an active roller stabilizer (ARS), and operation information of the stabilizer bar; and
    a controller configured to calculate a target torque value that is to be generated in the stabilizer bar on the basis of the sensed vehicle speed value, the sensed operation information of the actuator, and the sensed operation information of the stabilizer bar, and to determine whether the sensed vehicle speed value is a target vehicle speed value that is set to perform an ARS control mode, and in response to the sensed vehicle speed value determined to be the target vehicle speed value, and determine a deadband period in which a torque of the actuator is not transmitted, using a change value of a torque value and a change state of the torque value while the torque value is tracing the calculated target torque value.

2. The vehicle control apparatus of claim 1, wherein the controller is configured to confirm the deadband period when the torque value has a change value greater than a change value of the target torque value during a predetermined period of time while keeping a change state constant.

3. The vehicle control apparatus of claim 1, wherein the controller is further configured to control the actuator to generate a torque in the stabilizer bar according to the calculated target torque value such that the torque value traces the calculated target torque value.

4. The vehicle control apparatus of claim 1, wherein the controller is further configured to:
    calculate a target torque value that is to be generated in the stabilizer bar and a target motor speed value on the basis of the sensed vehicle speed value, the sensed operation information of the actuator, and the sensed operation information of the stabilizer bar; and
    determine whether the sensed vehicle speed value is a target vehicle speed value that is set to perform an ARS control mode, and in response to the sensed vehicle speed value determined to be the target vehicle speed value, determine a deadband period in which a torque of the actuator is not transmitted using a change value of a torque value and a change value of a motor speed value while the torque value and the motor speed value are tracing the calculated target torque value and the calculated target motor speed value.

5. The vehicle control apparatus of claim 4, wherein the controller is configured to confirm the deadband period when the torque value has a change value greater than a change value of the target torque value while the motor speed value has a change value greater than a change value of the target motor speed value during a predetermined period of time.

6. The vehicle control apparatus of claim 4, wherein the controller is configured to confirm the deadband period when a difference between the change value of the torque value and the change value of the target torque value is greater than a reference value during a predetermined period of time while the motor speed value has a change value greater than a change value of the target motor speed value.

7. The vehicle control apparatus of claim 4, wherein the controller is further configured to control the actuator to generate a torque in the stabilizer bar according to the calculated target torque value and the calculated target motor speed value such that the torque value and the motor speed value trace the target torque value and the target motor speed value.

8. The vehicle control apparatus of claim 1, wherein the controller is further configured to:
determine whether the sensed vehicle speed value is a target vehicle speed value that is set to perform an ARS gain control mode in the ARS control mode to employ an ARS compensation gain value; and
in response to the vehicle speed value being a lower speed range value corresponding to the target vehicle speed value, control a response command for determining the deadband period by using an ARS compensation gain value corresponding to the lower speed range value and set to be smaller than an original ARS gain value in the determination of the deadband period.

9. The vehicle control apparatus of claim 8, wherein the controller, in response to the vehicle speed value being a higher speed range value corresponding to the target vehicle speed value, is further configured to control a response command for determining the deadband period by using an ARS compensation gain value corresponding to the higher speed range value and set to be larger than the original ARS gain value in the determination of the deadband period.

10. The vehicle control apparatus of claim 1, wherein the controller is further configured to:
determine whether the sensed vehicle speed value and the change value of the calculated target torque value are a target vehicle speed value and a target change value set to perform an ARS gain control mode in the ARS control mode to employ an ARS compensation gain value; and
in response to the vehicle speed value being a lower speed range value corresponding to the target vehicle speed value and in response to the change value of the target torque value being a small change range value corresponding to the target change value, control a response command for determining the deadband period by using an ARS compensation gain value corresponding to the lower speed range value and the small change range value and set to be smaller than an original ARS gain value in the determination of the deadband period.

11. The vehicle control apparatus of claim 10, wherein the controller, in response to the vehicle speed value being a higher speed range value corresponding to the target vehicle speed value and in response to the change value of the target torque value being a large change range value corresponding to the target change value, is further configured to control a response command for determining the deadband period by using an ARS compensation gain value corresponding to the higher speed range value and the large change range value and set to be larger than the original ARS gain value in the determination of the deadband period.

12. The vehicle control apparatus of claim 1, wherein the sensor is further configured to sense a steering speed value, wherein the controller is further configured to:
determine whether the sensed vehicle speed value and the sensed steering speed value are a target vehicle speed value and a target steering speed value that are set to perform an ARS gain control mode in the ARS control mode to employ an ARS compensation gain value; and
in response to the vehicle speed value being a lower speed range value corresponding to the target vehicle speed value and in response to the steering speed value being a lower steering speed range value corresponding to the target steering speed value, control a response command for determining the deadband period by using an ARS compensation gain value corresponding to the lower speed range value and the lower steering speed range value and set to be smaller than an original ARS gain value in the determination of the deadband period.

13. The vehicle control apparatus of claim 12, wherein the controller, in response to the vehicle speed value being a higher speed range value corresponding to the target vehicle speed value and in response to the steering speed value being a higher steering speed range value corresponding to the target steering speed value, is further configured to control a response command for determining the deadband period by using an ARS compensation gain value corresponding to the higher speed range value and the higher steering speed range value and set to be larger than an original ARS gain value in the determination of the deadband period.

14. A vehicle control apparatus comprising:
a sensor configured to sense a steering angle value and sense operation information of an actuator for generating a torque in a stabilizer bar of an active roll stabilizer (ARS) and operation information of the stabilizer bar; and
a controller configured to calculate a target torque value that is to be generated in the stabilizer on the basis of the sensed steering angle value, the sensed operation information of the actuator, and the sensed operation information of the stabilizer bar, and determine whether the sensed steering angle value has no change when performing a feedback control in which a torque value traces the calculated target torque value; and
a filter, in response to no change of the steering angle value, further configured to remove a noise signal of a feedback signal according to a first filtering level that is set to perform a strong filtering on the feedback signal during the feedback control.

15. The vehicle control apparatus of claim 14, wherein the filter, in response to a change of the steering angle value, is further configured to remove a noise signal of the feedback signal according to a second filtering level that is set to perform a weak filtering on the feedback signal.

16. The vehicle control apparatus of claim 14, wherein the controller is further configured to perform a feedforward control by outputting a feedforward signal such that an actuator driver command corresponding to the target torque value is applied in advance to operate the actuator;
the filter, in response to a change of the steering angle value, is further configured to remove a noise signal of the feedback signal according to a second filtering level that is set to perform a weak filtering on the feedback signal; and the controller is further configured to calculate an actuator target position value by adding a target position value of the feedback signal, in which the noise signal is removed according to one of the first filtering level and the second filtering level, together with a target position value of the feedforward signal.

17. The vehicle control apparatus of claim 16, wherein the controller is further configured to determine a need for a rapid response in the determination of a deadband period in which a torque of the actuator is not transmitted, and comprises a filter, in response to no need for the rapid response, further configured to remove a noise signal of an actuator target position signal, which is generated from the calculated actuator target position value, according to a third filtering level that is set to perform a strong filtering on the actuator target position signal.

18. The vehicle control apparatus of claim 17, wherein the controller comprises a filter, in response to a need for the rapid response, further configured to remove a noise signal of an actuator target position signal, which is generated from the calculated actuator target position value, according to a fourth filtering level that is set to perform a weak filtering on the actuator target position signal.

19. The vehicle control apparatus of claim 16, wherein the controller is further configured to determine a state of being a deadband period in which a torque of the actuator is not transmitted, and comprises a filter, in response to the deadband period not confirmed by the controller, further configured to remove a noise signal of an actuator target position signal, which is generated from the calculated actuator target position value, according to a fifth filtering level that is set to perform a strong filtering on the actuator target position signal.

20. The vehicle control apparatus of claim 19, wherein the controller comprises a filter, in response to the deadband period confirmed by the controller, configured to remove a noise signal of an actuator target position signal, which is generated from the calculated actuator target position value, according to a sixth filtering level that is set to perform a weak filtering on the actuator target position signal.

21. A vehicle control method comprising:
sensing a vehicle speed value, operation information of an actuator for generating a torque in a stabilizer bar of an active roller stabilizer (ARS), and operation information of the stabilizer bar;
calculating a target torque value that is to be generated in the stabilizer bar on the basis of the sensed vehicle speed value, the sensed operation information of the actuator, and the sensed operation information of the stabilizer bar;
determining whether the sensed vehicle speed value is a target vehicle speed value that is set to perform an ARS control mode; and
in response to the sensed vehicle speed value determined to be the target vehicle speed value, determining a deadband period in which a torque of the actuator is not transmitted, using a change value of a torque value and a change state of the torque value while the torque value is tracing the calculated target torque value.

22. The vehicle control method of claim 21, wherein the deadband period is confirmed when the torque value has a change value greater than a change value of the target torque value during a predetermined period of time while keeping a change state constant.

23. The vehicle control method of claim 21, further comprising controlling the actuator to generate a torque in the stabilizer bar according to the calculated target torque value such that the torque value traces the calculated target torque value.

24. The vehicle control method of claim 21, further comprising:
calculating a target torque value that is to be generated in the stabilizer bar and a target motor speed value on the basis of the sensed vehicle speed value, the sensed operation information of the actuator, and the sensed operation information of the stabilizer bar;
determine whether the sensed vehicle speed value is a target vehicle speed value that is set to perform an ARS control mode; and
in response to the sensed vehicle speed value determined to be the target vehicle speed value, determining a deadband period in which a torque of the actuator is not transmitted using a change value of a torque value and a change value of a motor speed value while the torque value and the motor speed value are tracing the calculated target torque value and the calculated target motor speed value.

25. The vehicle control method of claim 24, wherein the deadband period is confirmed when the torque value has a change value greater than a change value of the target torque value while the motor speed value has a change value greater than a change value of the target motor speed value during a predetermined period of time.

26. The vehicle control method of claim 24, wherein the deadband period is confirmed when a difference between the change value of the torque value and the change value of the target torque value is greater than a reference value during a predetermined period of time while the motor speed value has a change value greater than a change value of the target motor speed value.

27. The vehicle control method of claim 24, further comprising controlling the actuator to generate a torque in the stabilizer bar according to the calculated target torque value and the calculated target motor speed value such that the torque value and the motor speed value trace the target torque value and the target motor speed value.

28. The vehicle control method of claim 21, further comprising determining whether the sensed vehicle speed value is a target vehicle speed value that is set to perform an ARS gain control mode in the ARS control mode to employ an ARS compensation gain value; and
in response to the vehicle speed value being a lower speed range value corresponding to the target vehicle speed value, controlling a response command for determining the deadband period by using an ARS compensation gain value corresponding to the lower speed range value and set to be smaller than an original ARS gain value in the determination of the deadband period.

29. The vehicle control method of claim 28, further comprising, in response to the vehicle speed value being a higher speed range value corresponding to the target vehicle speed value, controlling a response command for determining the deadband period by using an ARS compensation gain value corresponding to the higher speed range value and set to be larger than the original ARS gain value in the determination of the deadband period.

30. The vehicle control method of claim 21, further comprising determining whether the sensed vehicle speed value and the change value of the calculated target torque value are a target vehicle speed value and a target change value that are set to perform an ARS gain control mode in the ARS control mode to employ an ARS compensation gain value; and in response to the vehicle speed value being a lower speed range value corresponding to the target vehicle speed value and the change value of the target torque value being a small change range value corresponding to the target change value, controlling a response command for determining the deadband period by using an ARS compensation gain value corresponding to the lower speed range value and the small change range value and set to be smaller than an original ARS gain value in the determination of the deadband period.

31. The vehicle control method of claim 30, further comprising, in response to the vehicle speed value being a higher speed range value corresponding to the target vehicle speed value and in response to the change value of the target torque value being a large change range value corresponding to the target change value, controlling a response command for determining the deadband period by using an ARS compensation gain value corresponding to the higher speed range value and the large change range value and set to be larger than the original ARS gain value in the determination of the deadband period.

32. The vehicle control method of claim 21, further comprising:

sensing a steering speed value;

determining whether the sensed vehicle speed value and the sensed steering speed value are a target vehicle speed value and a target steering speed value that are set to perform an ARS gain control mode in the ARS control mode to employ an ARS compensation gain value; and in response to the vehicle speed value being a lower speed range value corresponding to the target vehicle speed value and in response to the steering speed value being a lower steering speed range value corresponding to the target steering speed value, controlling a response command for determining the deadband period by using an ARS compensation gain value corresponding to the lower speed range value and the lower steering speed range value and set to be smaller than an original ARS gain value in the determination of the deadband period.

33. The vehicle control method of claim 32, further comprising, in response to the vehicle speed value being a higher speed range value corresponding to the target vehicle speed value and in response to the steering speed value being a higher steering speed range value corresponding to the target steering speed value, controlling a response command for determining the deadband period by using an ARS compensation gain value corresponding to the higher speed range value and the higher steering speed range value and set to be larger than an original ARS gain value in the determination of the deadband period.

34. A vehicle control method comprising:

sensing a steering angle value and sensing operation information of an actuator for generating a torque in a stabilizer bar of an active roll stabilizer (ARS) and operation information of the stabilizer bar;

calculating a target torque value that is to be generated in the stabilizer on the basis of the sensed steering angle value, the sensed operation information of the actuator, and the sensed operation information of the stabilizer bar;

determining whether the sensed steering angle value has no change when performing a feedback control in which a torque value traces the calculated target torque value; and in response to no change of the steering angle value, removing a noise signal of a feedback signal according to a first filtering level that is set to perform a strong filtering on the feedback signal during the feedback control.

35. The vehicle control method of claim 34, further comprising, in response to a change of the steering angle value, removing a noise signal of the feedback signal according to a second filtering level that is set to perform a weak filtering on the feedback signal.

36. The vehicle control method of claim 34, further comprising:

performing a feedforward control by outputting a feedforward signal such that an actuator driver command corresponding to the target torque value is applied in advance to operate the actuator;

in response to a change of the steering angle value, removing a noise signal of the feedback signal according to a second filtering level that is set to perform a weak filtering on the feedback signal; and calculating an actuator target position value by adding a target position value of the feedback signal, in which the noise signal is removed according to one of the first filtering level and the second filtering level, together with a target position value of the feedforward signal.

37. The vehicle control method of claim 36, further comprising:

determining a need for a rapid response in the determination of a deadband period in which a torque of the actuator is not transmitted, and in response to no need for the rapid response, removing a noise signal of an actuator target position signal, which is generated from the calculated actuator target position value, according to a third filtering level that is set to perform a strong filtering on the actuator target position signal.

38. The vehicle control method of claim 37, further comprising, in response to a need for the rapid response, removing a noise signal of an actuator target position signal, which is generated from the calculated actuator target position value, according to a fourth filtering level that is set to perform a weak filtering on the actuator target position signal.

39. The vehicle control method of claim 36, further comprising:

determining a state of being a deadband period in which a torque of the actuator is not transmitted, and in response to the deadband period not confirmed, removing a noise signal of an actuator target position signal, which is generated from the calculated actuator target position value, according to a fifth filtering level that is set to perform a strong filtering on the actuator target position signal.

40. The vehicle control method of claim 39, further comprising, in response to the deadband period confirmed, removing a noise signal of an actuator target position signal, which is generated from the calculated actuator target position value, according to a sixth filtering level that is set to perform a weak filtering on the actuator target position signal.

* * * * *